(12) United States Patent
He et al.

(10) Patent No.: US 10,881,246 B2
(45) Date of Patent: Jan. 5, 2021

(54) GAS AIR FRYER

(71) Applicant: Team International Group of America Inc., Miami Gardens, FL (US)

(72) Inventors: Arno He, Guangdong (CN); Uri Murad, Hollywood, FL (US); Paul Simon, Elizabethtown, KY (US); Michael Giebel, Joplin, MO (US)

( * ) Notice: Subject to any disclaimer, the term of this patent is extended or adjusted under 35 U.S.C. 154(b) by 0 days.

(21) Appl. No.: 16/848,019

(22) Filed: Apr. 14, 2020

(65) Prior Publication Data

US 2020/0253420 A1 Aug. 13, 2020

Related U.S. Application Data

(63) Continuation-in-part of application No. 16/387,604, filed on Apr. 18, 2019, now Pat. No. 10,638,882.

(60) Provisional application No. 62/954,985, filed on Dec. 30, 2019, provisional application No. 62/789,125, filed on Jan. 7, 2019.

(51) Int. Cl.

| | | |
|---|---|---|
| *A47J 37/07* | (2006.01) | |
| *A47J 37/06* | (2006.01) | |
| *A47J 36/32* | (2006.01) | |
| *A21B 1/10* | (2006.01) | |
| *F24C 3/08* | (2006.01) | |
| *F24C 15/32* | (2006.01) | |

(52) U.S. Cl.
CPC ............ *A47J 37/0713* (2013.01); *A21B 1/10* (2013.01); *A47J 36/32* (2013.01); *A47J 37/0647* (2013.01); *A47J 37/0754* (2013.01); *A47J 37/0786* (2013.01); *F24C 3/087* (2013.01); *F24C 15/322* (2013.01)

(58) Field of Classification Search
CPC ....... F24C 15/18; F24C 15/2007; F24C 3/008
USPC .................... 99/330, 336, 447; 219/400, 411
See application file for complete search history.

(56) References Cited

U.S. PATENT DOCUMENTS

| | | | | |
|---|---|---|---|---|
| 3,324,844 A | * | 6/1967 | Huffman | F24C 15/322 |
| | | | | 126/21 A |
| 3,587,557 A | * | 6/1971 | Henderson | F24C 14/025 |
| | | | | 126/21 A |
| 4,817,582 A | * | 4/1989 | Oslin | A21B 1/24 |
| | | | | 126/20 |
| 5,121,737 A | | 6/1992 | Yencha | |
| 5,676,870 A | * | 10/1997 | Wassman | F24C 15/325 |
| | | | | 126/21 A |

(Continued)

FOREIGN PATENT DOCUMENTS

| | | | | |
|---|---|---|---|---|
| GB | 2197458 | | 5/1988 | |
| KR | 20050012379 A | * | 2/2005 | ............. F24C 15/18 |

*Primary Examiner* — Thien S Tran
(74) *Attorney, Agent, or Firm* — Frank Marino

(57) ABSTRACT

An outdoor cooking appliance in combination with an air frying apparatus that has a frying burner, a blower, a heat exchanger, and a cooking chamber. The frying burner is adapted to combust fuel to create heat and other products of combustion. The blower is adapted to circulate a cooking airstream. The heat exchanger is adapted to allow passage of the heat from the combusted fuel while preventing passage of the other products of combustion into the cooking air stream. The blower is further adapted to supply the heated cooking airstream through the heat exchanger to the cooking chamber to cook foodstuff disposed therein while the other products of combustion are not supplied to the cooking chamber.

20 Claims, 19 Drawing Sheets

(56) References Cited

U.S. PATENT DOCUMENTS

| | | | |
|---|---|---|---|
| 5,994,672 A | 11/1999 | Mestnik | |
| 6,131,559 A * | 10/2000 | Norris | F24C 15/006 |
| | | | 126/21 A |
| 10,561,277 B1 * | 2/2020 | Swayne | A47J 37/0641 |
| 2008/0098902 A1 | 5/2008 | Mansfield | |
| 2008/0206420 A1 | 8/2008 | McFadden | |
| 2010/0206304 A1 * | 8/2010 | Kim | F23D 14/12 |
| | | | 126/91 R |
| 2011/0275023 A1 * | 11/2011 | Knight | A47J 37/0754 |
| | | | 432/1 |
| 2019/0387922 A1 * | 12/2019 | Jin | A23L 5/17 |

* cited by examiner

GAS AIR FRYER

FIELD OF THE INVENTION

The invention relates to apparatuses for frying foodstuffs in hot air and without submersion in cooking oil.

BACKGROUND

Common electrical air frying appliances include an electric heating element for heating air within the appliance and a blower for forcing the air over and around the foodstuffs to be air fried. Such appliances function adequately but are made only for indoor use and may cause smoke and undesired cooking fumes. Summertime is a very popular time for outdoor cooking. Many fried foods, such as fried chicken, onion rings, and fried claims are popular summertime food, but have so far required indoor cooking. Few food items are as historically paired as hamburgers and French fries, yet summertime burgers are typically cooked outdoors while French fries have so far required indoor cooking.

In order to simulate the qualities of properly deep-fried foods, air fried foods must be exposed to turbulent air having a temperature of approximately 220 degrees C. This ensures the even browning and crispiness like that which is obtained when cooking in hot oil. But such is difficult to obtain from a propane flame. While propane burns at a very high temperature, transferring that heat from the flame in a highly turbulent environment to obtain the needed air-frying temperature and turbulence at the food has so far been unobtainable.

There exists the need for an apparatus which allows for the outdoor cooking of fried foods, and such may be an object of the invention. There exists the need for an apparatus which allows for such outdoor cooking of fried foods in combination with outdoor grilling, and such may be an object of the invention. There exists the need for the ability to share fuel use, cooking utensils, clean-up, and other things between outdoor grilling and outdoor frying, and such may be an object of the invention. There exists the need for a system which causes a high enough temperature at its heat source to result in adequate air-frying conditions at the food, and such may be an object of the invention. There exists the need for a system which causes that high enough temperature by injecting air into the heat source using a blower that also causes the needed turbulence for those adequate air-frying conditions at the food, and such may be an object of the invention.

The burning of many fuels, including gas fuels, wood, charcoal, etc., results not only in the production of desirable heat for cooking, but also in the production of other undesirable products of combustion, such as CO, NOx, ash, carbon dust, etc. A drawback to air-frying foods in an airstream that is derived directly for combusting fuel is that the foods might be exposed to these undesirables, not only impairing the flavor and appearance of the cooked foods, but also being potentially unhealthful.

There exists the need for a means to air-fry foods in air that is heated by combusting fuels while avoiding the exposure of the food to other products of the combustion of the fuel, and such may be an object of the invention.

Further needs and objects of the invention will become apparent upon a review of the following disclosure of exemplary embodiments.

SUMMARY OF THE INVENTION

The invention may be embodied in or practiced using a gas burning air-frying appliance of a gas burning air-frying accessory to an outdoor gas grill or griddle.

The invention may be embodied in or practiced using an air frying apparatus with a blower-burner portion and a chamber portion. The blower-burner portion may have an intake for receiving ambient air, a burner for heating the received air, a window in communication with the chamber portion, and a blower for dispersing the heated air into the chamber portion. The chamber portion may include a perforated basket for receiving foodstuff and may be adapted to allow access to the foodstuff by the dispersed heated air. The air heated by the burner may be dispersed through the window to the chamber portion by the blower where it air-fries the foodstuff in the basket. The blower-burner portion and the chamber portion may be within a housing and the chamber portion may have a drawer adapted to be pulled from the housing to access the basket. The drawer may be covered by the housing during the air-frying and may be uncovered when pulled from the housing to allow the access to the basket. The chamber portion may have an outlet for exhausting the heated air from the chamber portion. The drawer may have a handle disposed in a front thereof, and the outlet may be directed rearwardly and away from the handle. The burner may be a gas burner. The blower may be an electric blower. The blower may cause the received air to feed a flame of the gas burner and thereby increase its temperature to increase the heated air's temperature. The heated air's increased temperature may be approximately 220 degrees C. when reaching the chamber portion.

The invention may also be embodied in or practiced using, in combination, a gas barbeque grill and the above air frying apparatus. The gas barbeque grill may provide the above housing. The drawer may be covered by the gas barbeque grill during the air-frying and may be uncovered when pulled from the gas barbeque grill to allow the access to the basket.

The invention may also be embodied in or practiced using an air frying apparatus having a burner, a blower, a heat exchanger, and a cooking chamber. The burner may be adapted to combust fuel to create heat and other products of combustion. The blower may be adapted to circulate a cooking airstream. The heat exchanger may be adapted to allow passage of the heat from the combusted fuel while preventing passage of the other products of combustion into the cooking air stream. The blower may further be adapted to supply the heated cooking airstream through the heat exchanger to the cooking chamber to cook foodstuff disposed therein, whereby the other products of combustion are not supplied to the cooking chamber. The burner may be a gas burner. The blower may be an electric blower.

The apparatus may further have a housing and the cooking chamber may include a perforated tray for containing the foodstuff, disposable within the housing during cooking and removable from the housing to access the foodstuff. The tray may be covered by the housing during cooking and is uncovered when removed from the housing to allow the access to the tray. The apparatus may further be combined into an outdoor cooking appliance having a body that is the housing. The outdoor cooking appliance may have a cooking surface such as grill or griddle, and the burner, blower, heat exchanger, and cooking chamber may be disposed below the cooking surface.

The apparatus may further include a thermostat adapted for sensing temperature of the heated cooking airstream and in communication with one or both of the blower and the burner and adapted to control the one or both in response to the sensed temperature. The apparatus may have a selected temperature level and the thermostat may modify operation of the one or both when the sensed temperature reaches the selected temperature.

The apparatus may have one or more additional cooking chambers wherein one or more additional blowers may be adapted to selectively supply one or more additional heated cooking airstreams through the heat exchanger to the one or more additional cooking chambers to selectively cook foodstuff disposed therein. The cooking chambers may be disposed within drawers.

The apparatus may have one or more warming chambers for maintaining cooked food at a servable temperature. Those warming chambers may be disposed within drawers that are fashioned similarly to the cooking chamber drawers. The warming chambers may be warmed by a lower-temperature version of the heating system of the cooking chambers or may be warmed by conduction or convection from adjacent cooking chambers or from the cooking appliance.

The invention may also be embodied in or practiced using, in combination, the outdoor cooking appliance and the air frying apparatus as described above.

Further features and aspects of the invention are disclosed with more specificity in the Detailed Description and Drawings provided herein and showing exemplary embodiments of the invention.

BRIEF DESCRIPTION OF THE DRAWINGS

Exemplary embodiments of a gas burning air frying accessory for a gas outdoor cooking appliance in accordance with or useful in practicing the invention is shown in the accompanying Drawings, of which.

DESCRIPTION OF EXEMPLARY EMBODIMENTS

Figure 1:
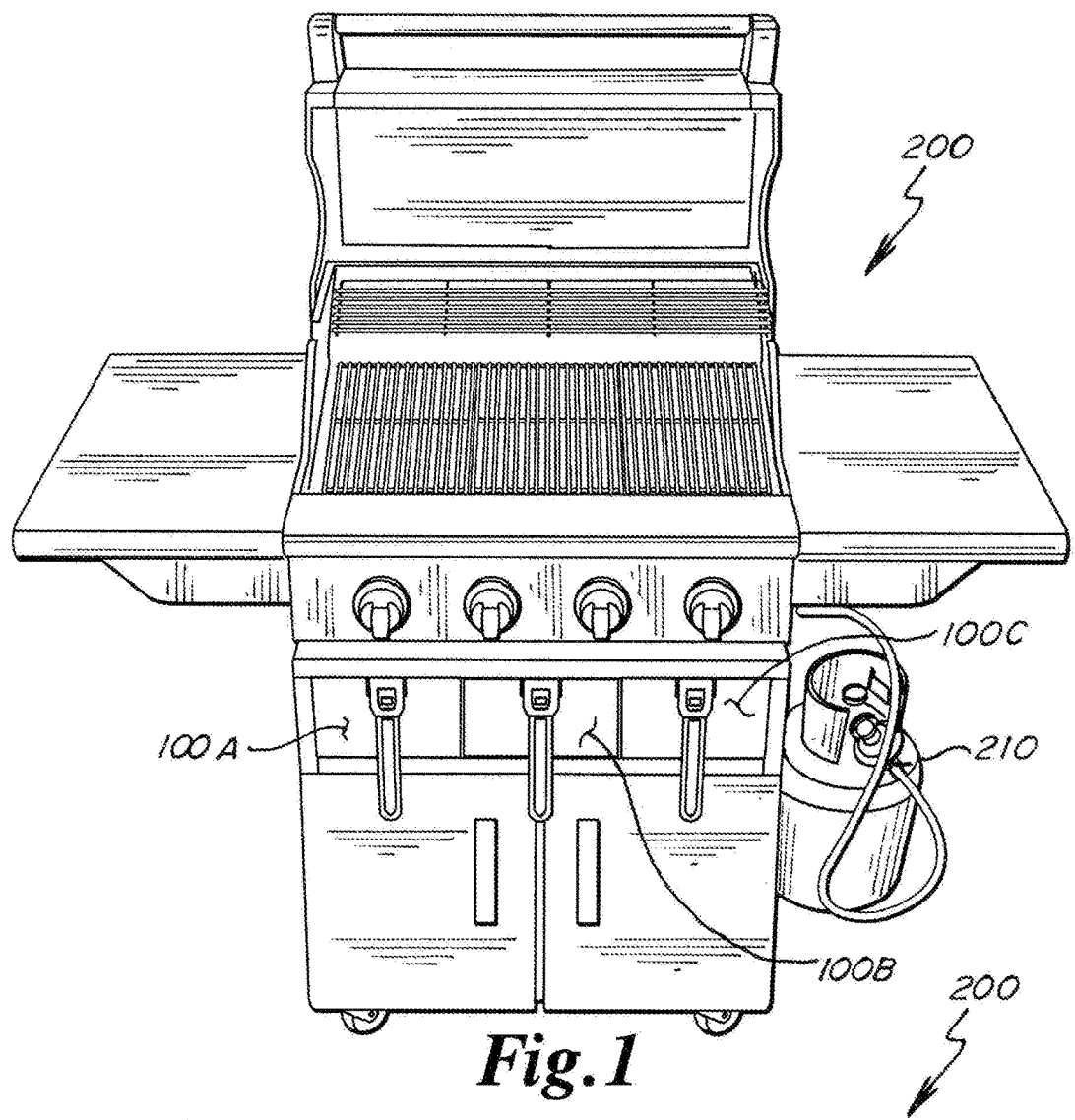
FIG. 1 is a front view of a gas barbeque grill employing a first accessory in accordance with or useful in practicing the invention.
Figure 2:
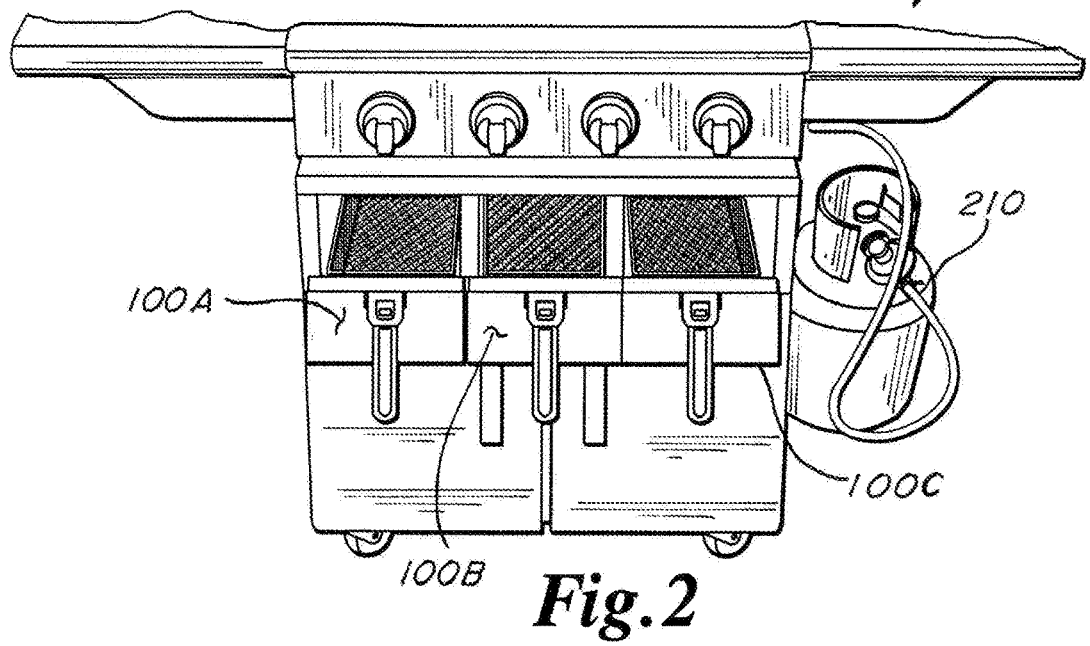
FIG. 2 is a partial front view of the barbeque grill of FIG. 1 with the drawers of the accessory opened.
Figure 3:
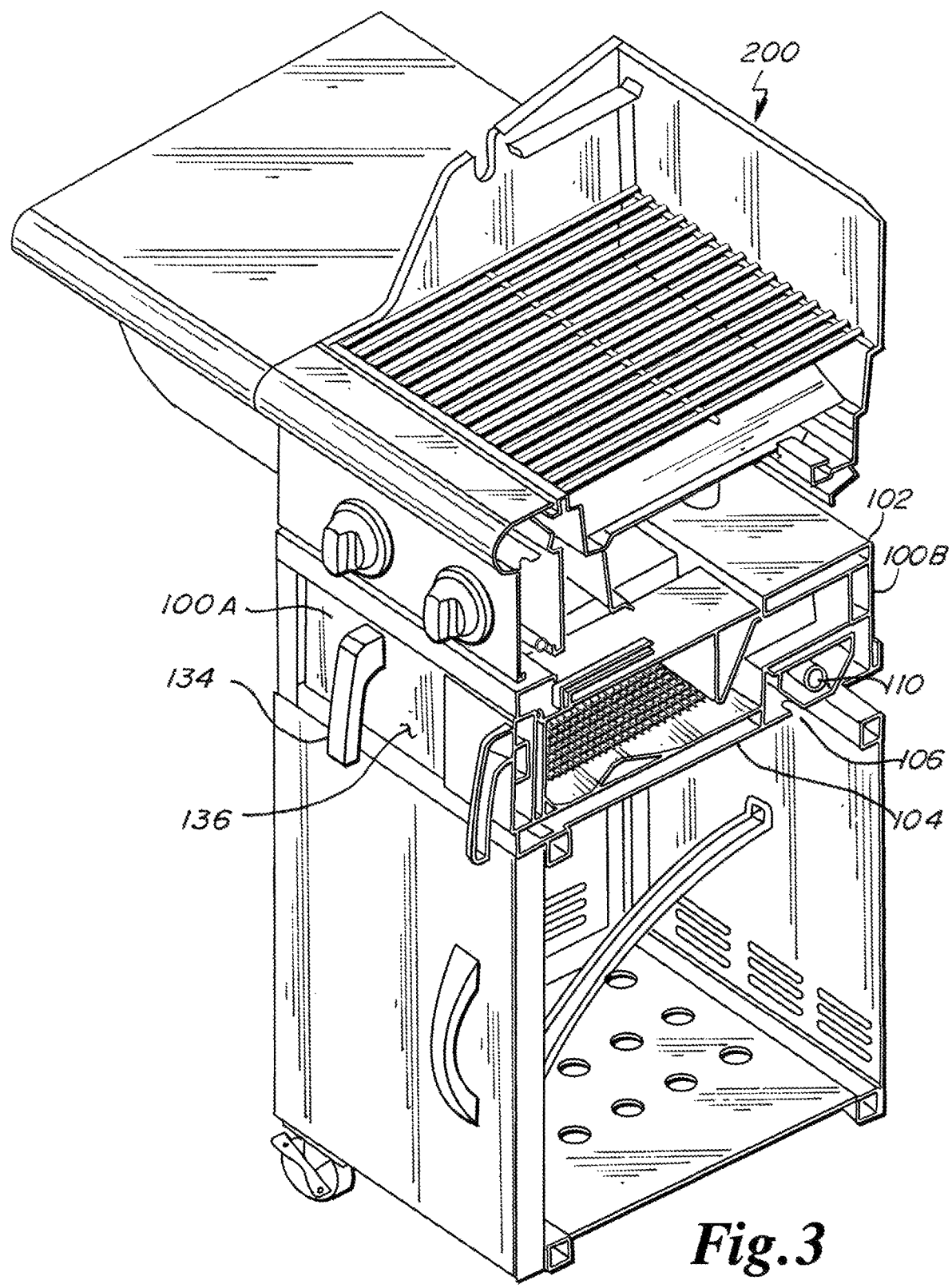
FIG. 3 is a partial cut-away front perspective view of the barbeque grill and accessory of FIG. 1.
Figure 4:
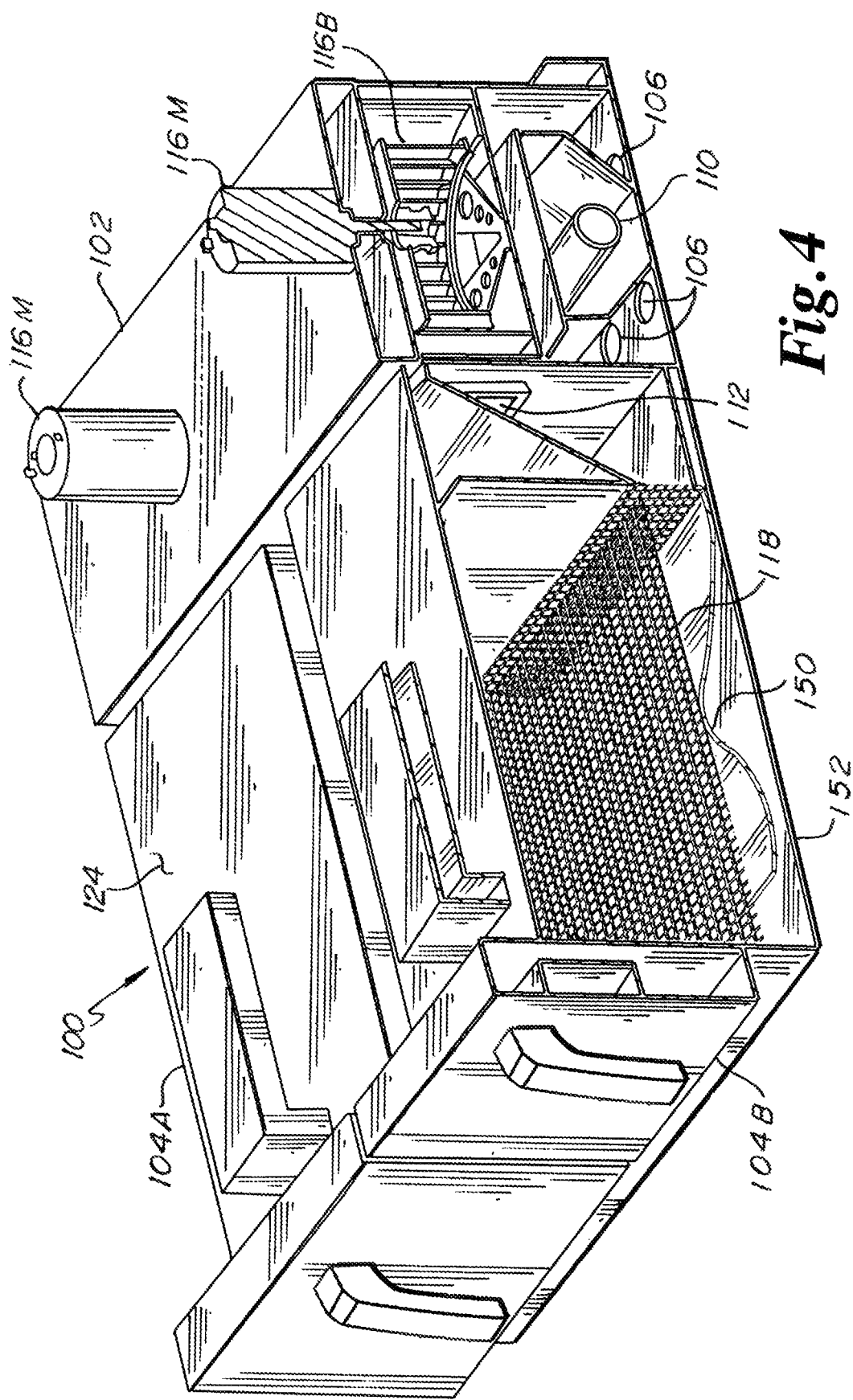
FIG. 4 is a partial cut-away perspective view of the accessory of FIG. 1.
Figure 5:
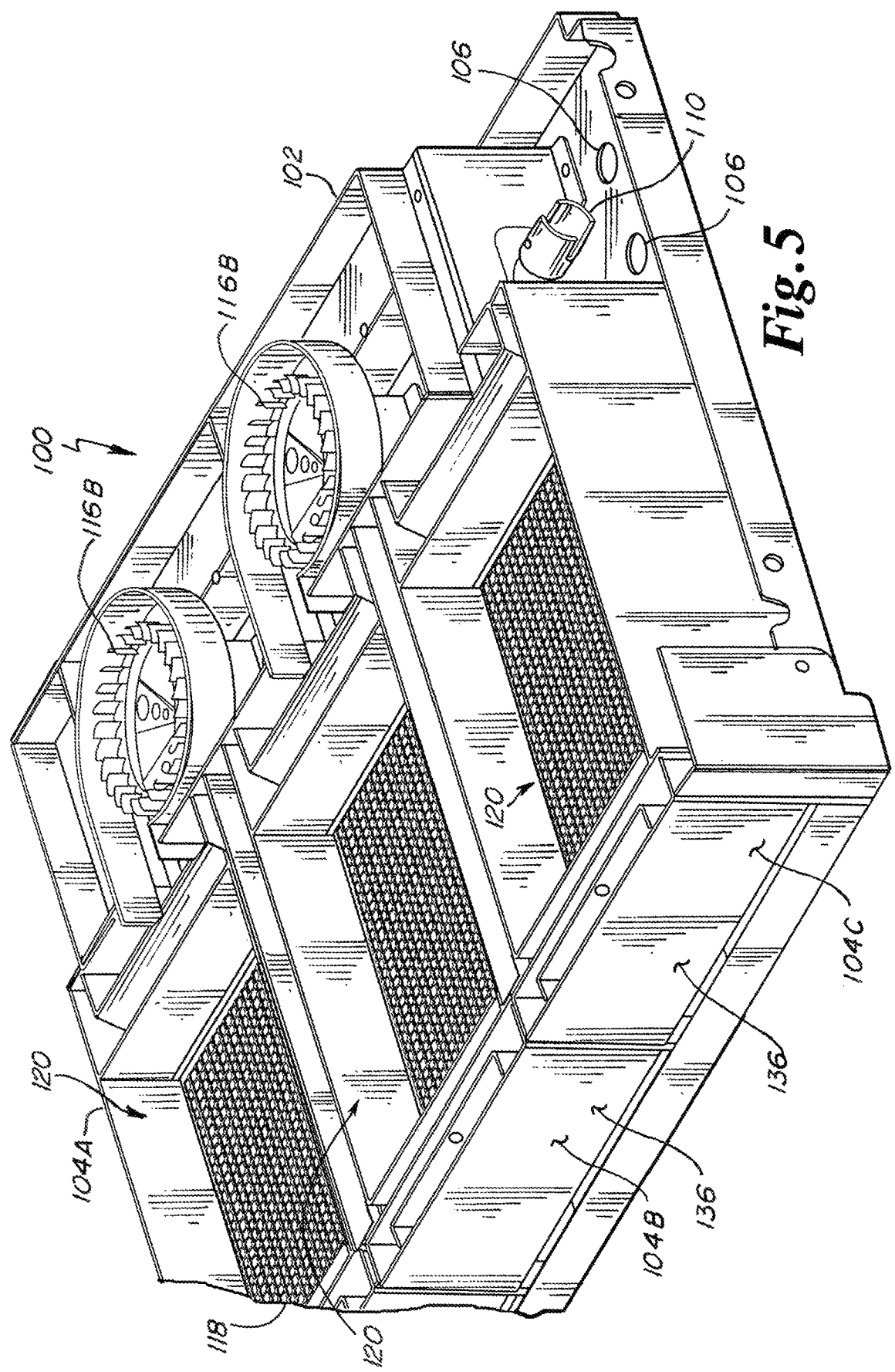
FIG. 5 is a partial perspective view of the accessory of FIG. 1.
Figure 6:
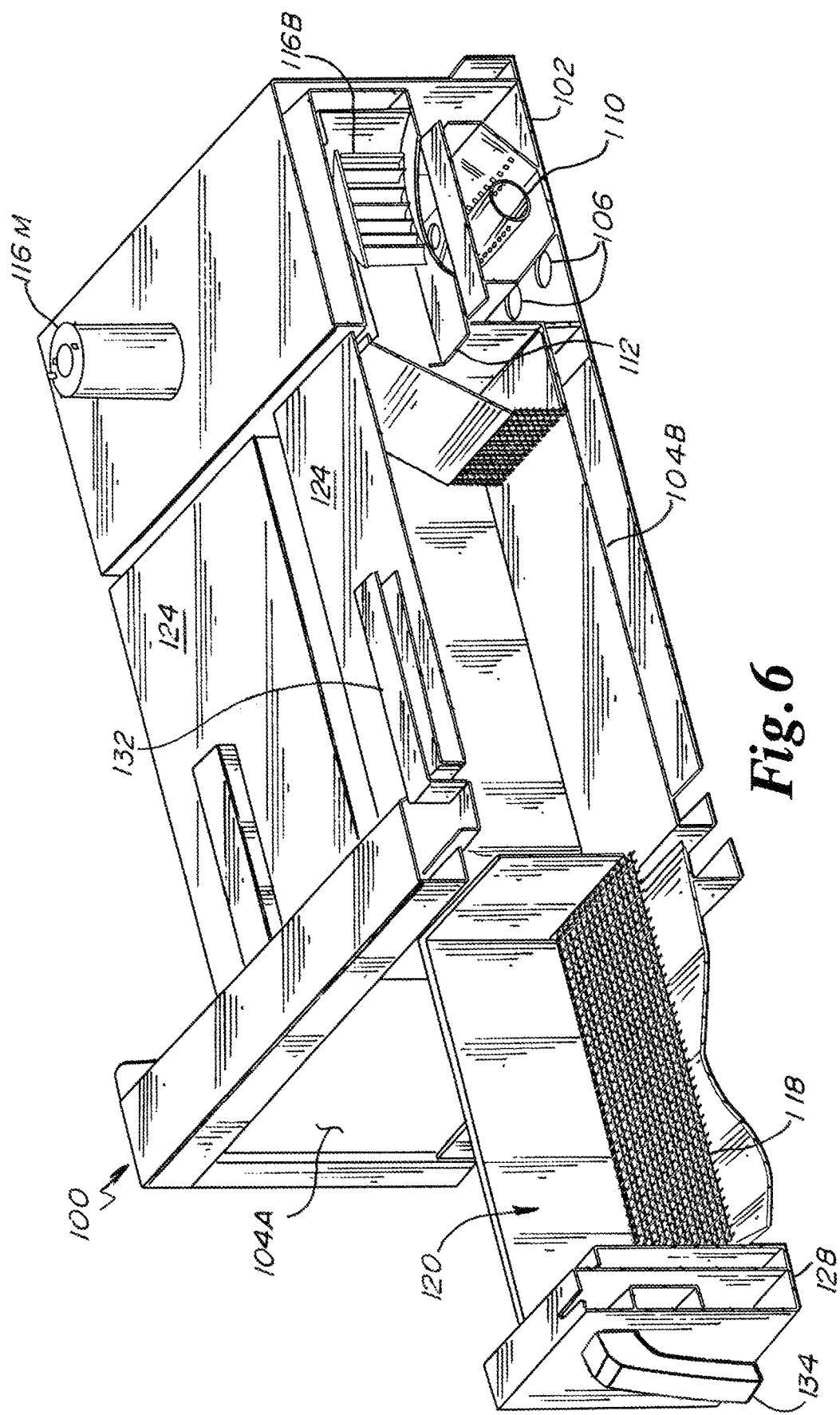
FIG. 6 is a partial cut-away perspective view of the accessory of FIG. 1 with one of its drawers opened.
Figure 7:
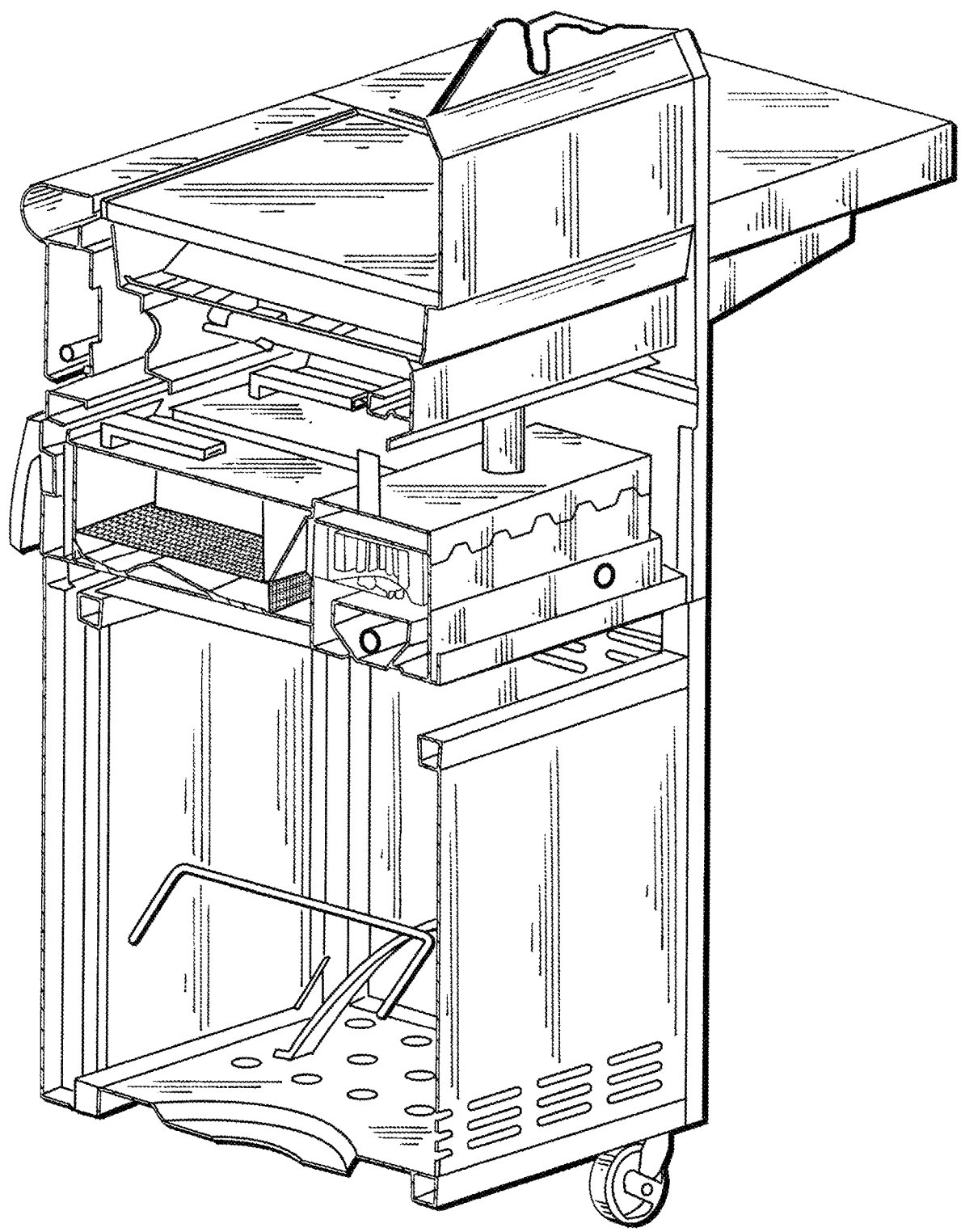
FIG. 7 is a partial cut-away rear perspective view of the barbeque grill and accessory of FIG. 1.
Figure 8:
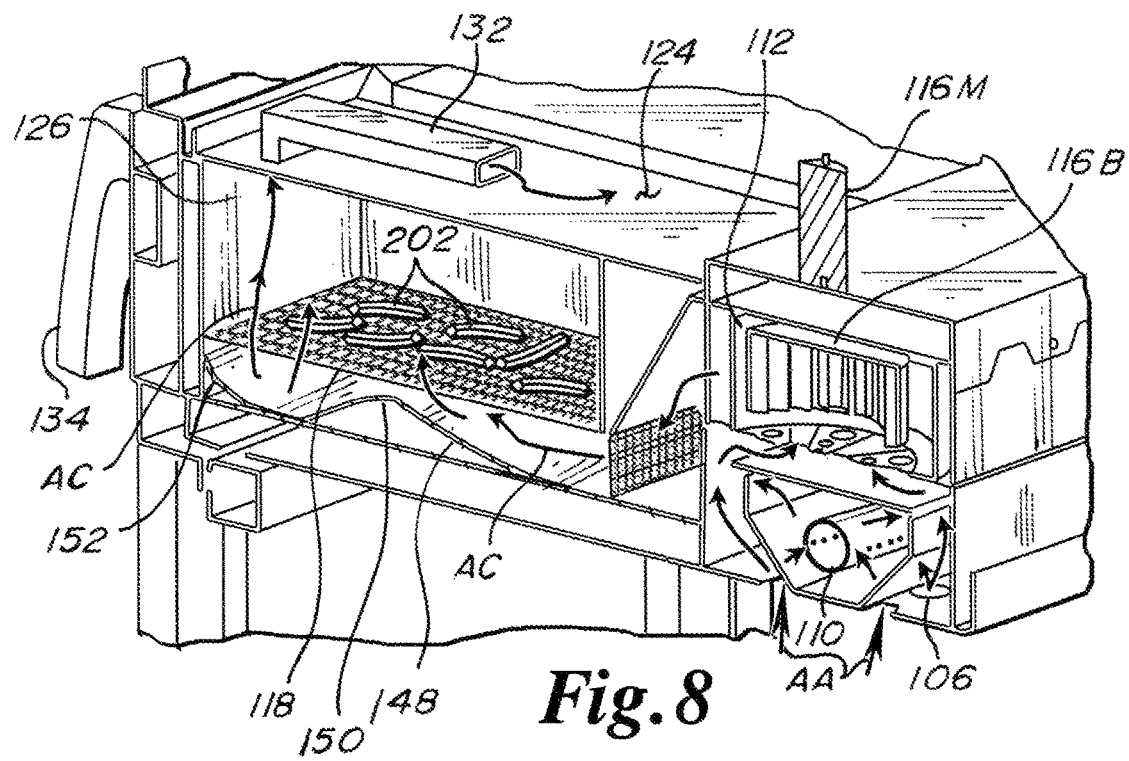
FIGS. 8 and 9 are cut-away views showing the airflow through the accessory of FIG. 1.
Figure 9:
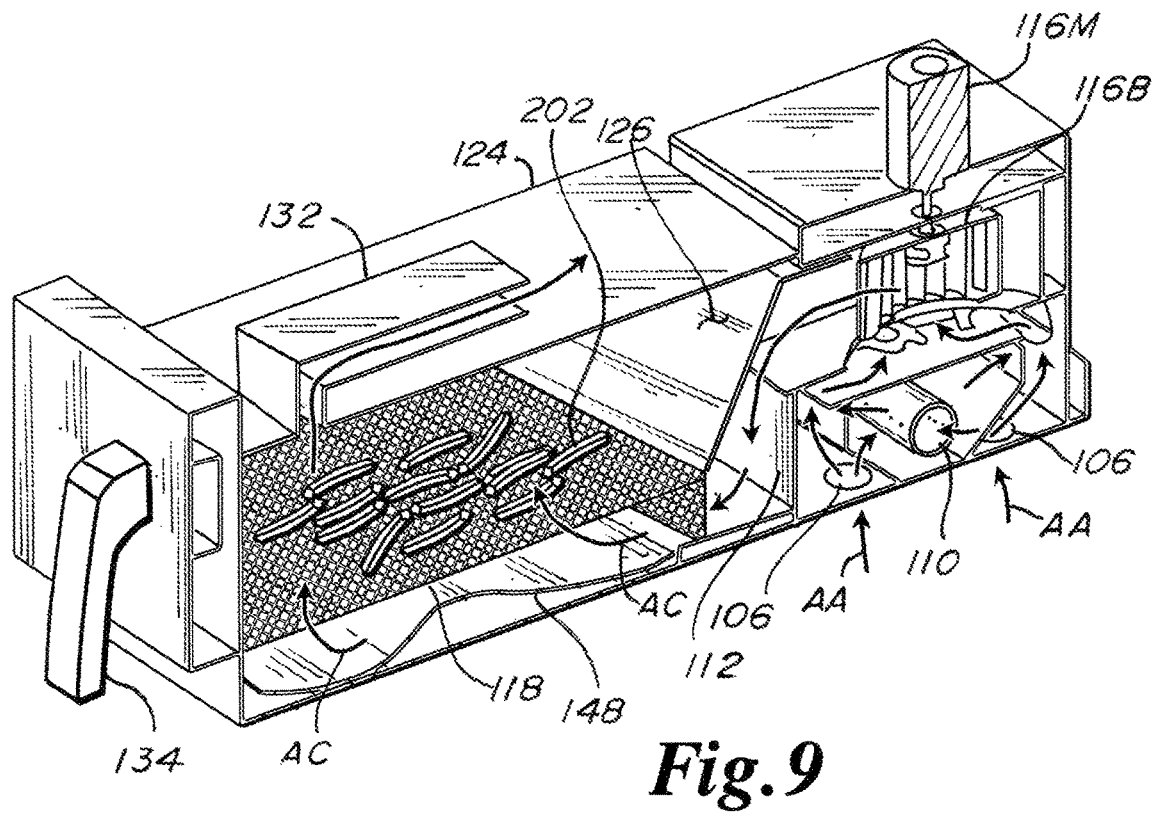
Figure 10:
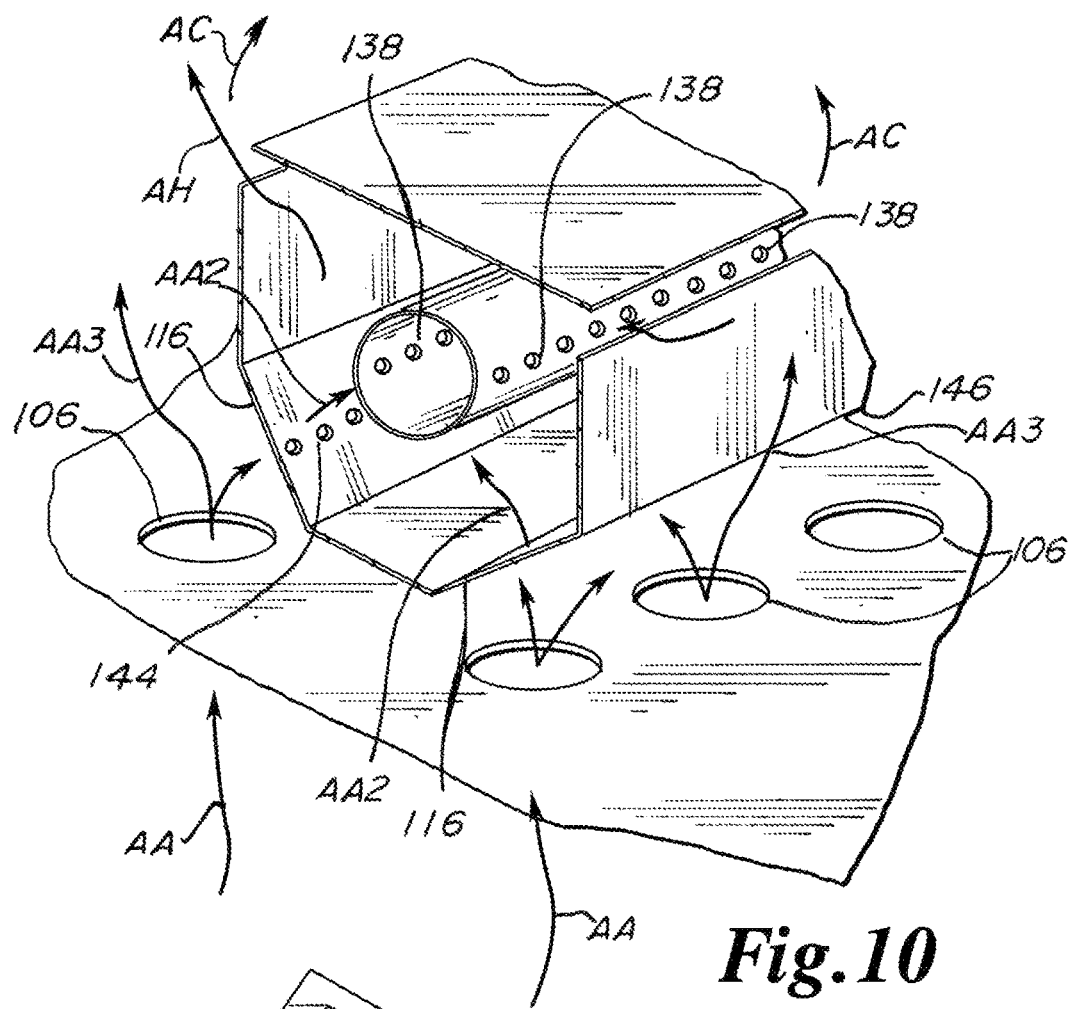
FIG. 10 is a partial perspective view of the combustion enclosure of the accessory of FIG. 1.

Referring to FIGS. 1 through 11, there is shown a first exemplary air frying accessory 100 having a plurality of modules 100A, 100B, and 100C, and a gas barbeque grill 200 within which it is used. The air frying accessory and the barbeque grill both receive propane gas for burning from the same tank 210. But of course, the type of gas used for fuel could alternatively be any other available flammable gas, including such gases as natural gas, methane, butane, and mixed gases. The air frying modules are all the same, and having a plurality enables the user to air-fry different foods at the same time or to stagger the timing of air-fried servings.

The air frying accessory has a blower-burner portion 102 and each module has a chamber portion 104A, 104B, and 104A (individually as 104). The blower-burner portion has intakes 106 for receiving ambient air AA, a burner 110 for heating the received air, a window 112 in communication with the chamber portion, and a blower for each module for dispersing the heated air 116 into the associated module's chamber portion. The blowers each include an electric motor 116M and a cylindrical blower wheel 116B. The chamber portion includes a perforated bottom panel 118 to thereby function as a perforated basket 120 for receiving foodstuff 202 and to allow access to the foodstuff by the dispersed heated air AC. The chamber portion is covered by chamber cover 124 so that the basket is enclosed within cooking chamber 126 during frying. The air heated by the burner is dispersed through the window to the chamber portion and into and around the foodstuff in the cooking chamber by the blower where it air-fries the foodstuff.

The blower-burner portion and the chamber portion are housed by the gas barbeque grill 200. The bottom of the chamber portion is a drawer 128 adapted to be pulled from the gas barbeque grill to access the basket. When the drawers are so pulled from the barbeque, covers 124 remain stationary within the barbeque. The open top of the drawer is thereby covered by the gas barbeque grill 200 during the air-frying and is uncovered when pulled from the gas barbeque grill to allow the access to the basket.

Each chamber portion includes an outlet 132 for exhausting the heated air from the chamber during cooking, so that freshly heated air may enter through the perforated bottom panel to maintain the desired temperature within the chamber.

Each drawer has a handle 134 disposed on its front face 136, and the outlet is directed rearwardly within the barbeque and away from the handle. In this way, the front of the barbeque, accessory, and handle do not become too hot to touch, and the exhausted hot air can be repurposed to add heat for the barbequing above.

Figure 11:
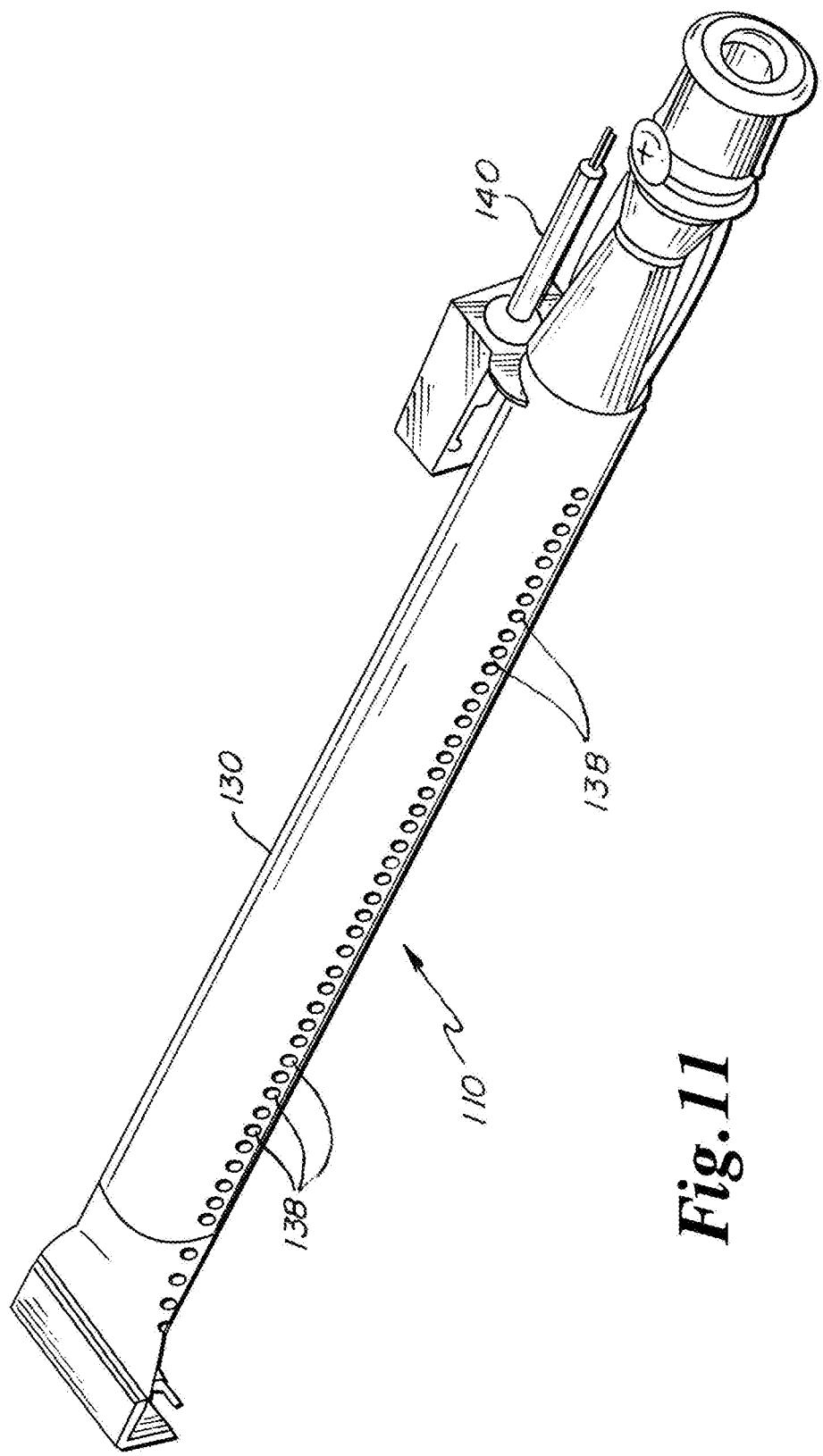
FIG. 11 is a view of the burner of the accessory of FIG. 1.
Figure 13:
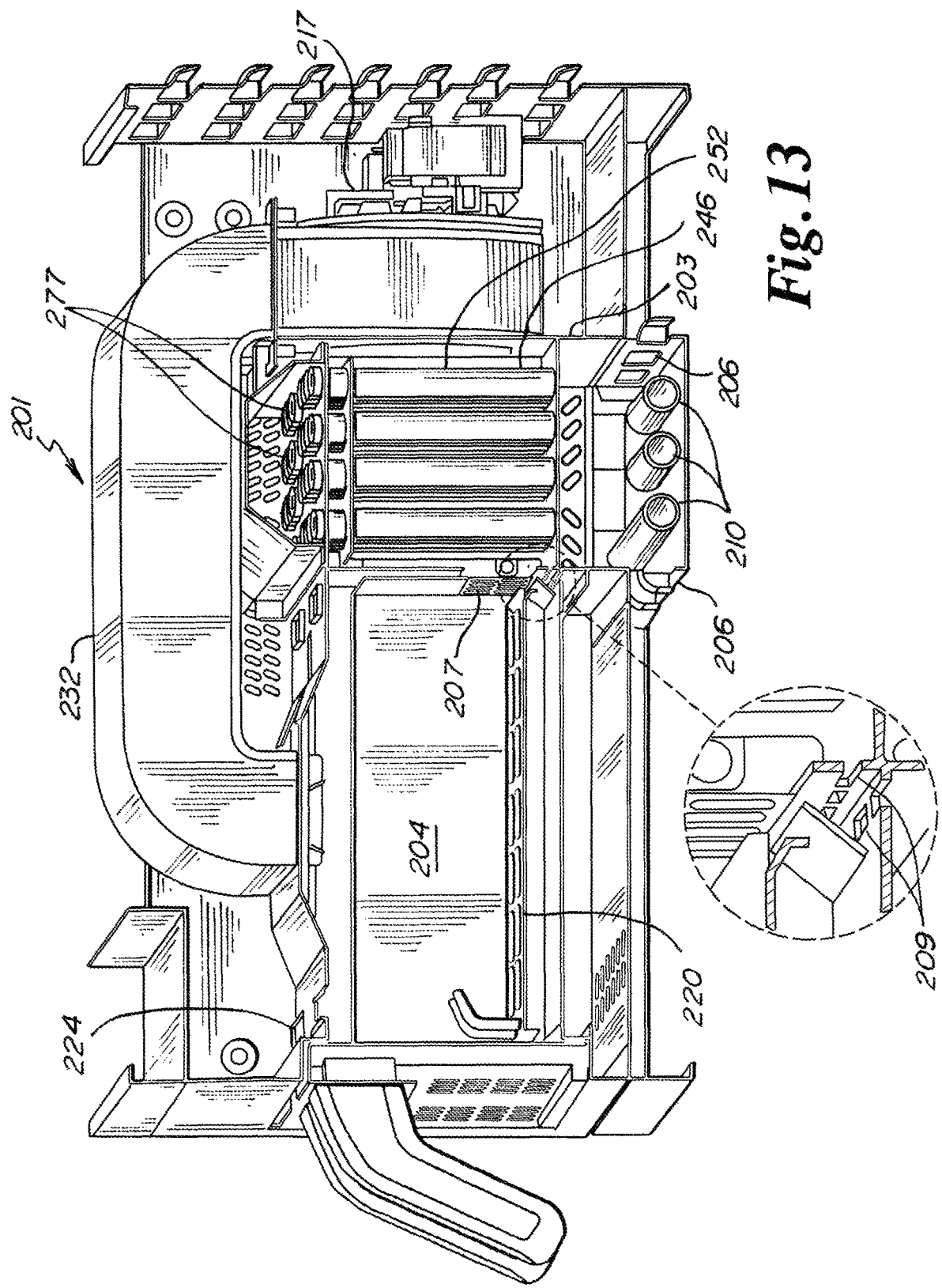
FIG. 13 is a partial cut-away right-side perspective view of an individual module of a second accessory in accordance with or useful in practicing the invention.
Figure 14:
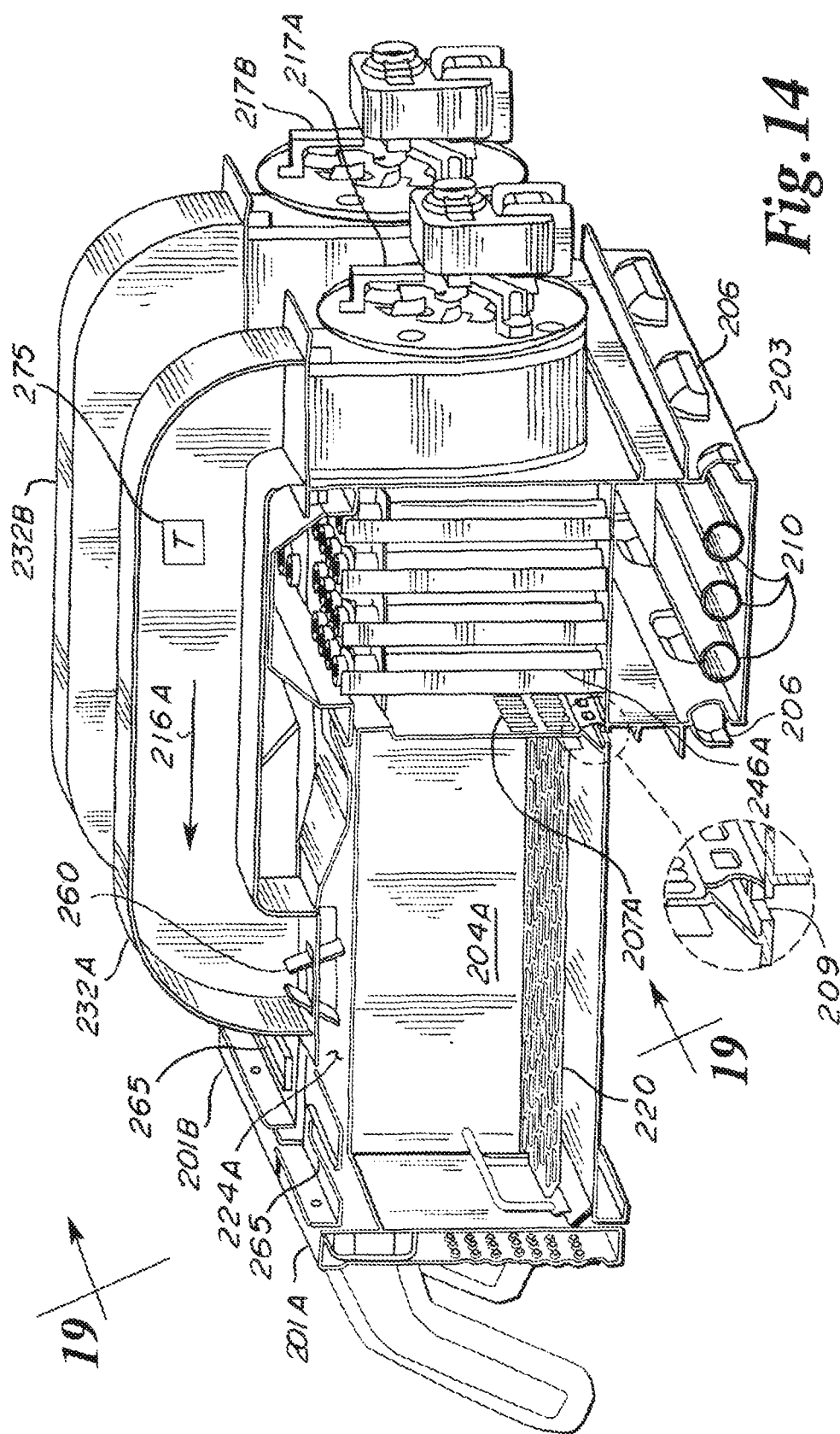
FIG. 14 is a partial cut-away left-side perspective view of the accessory of FIG. 13.
Figure 15:
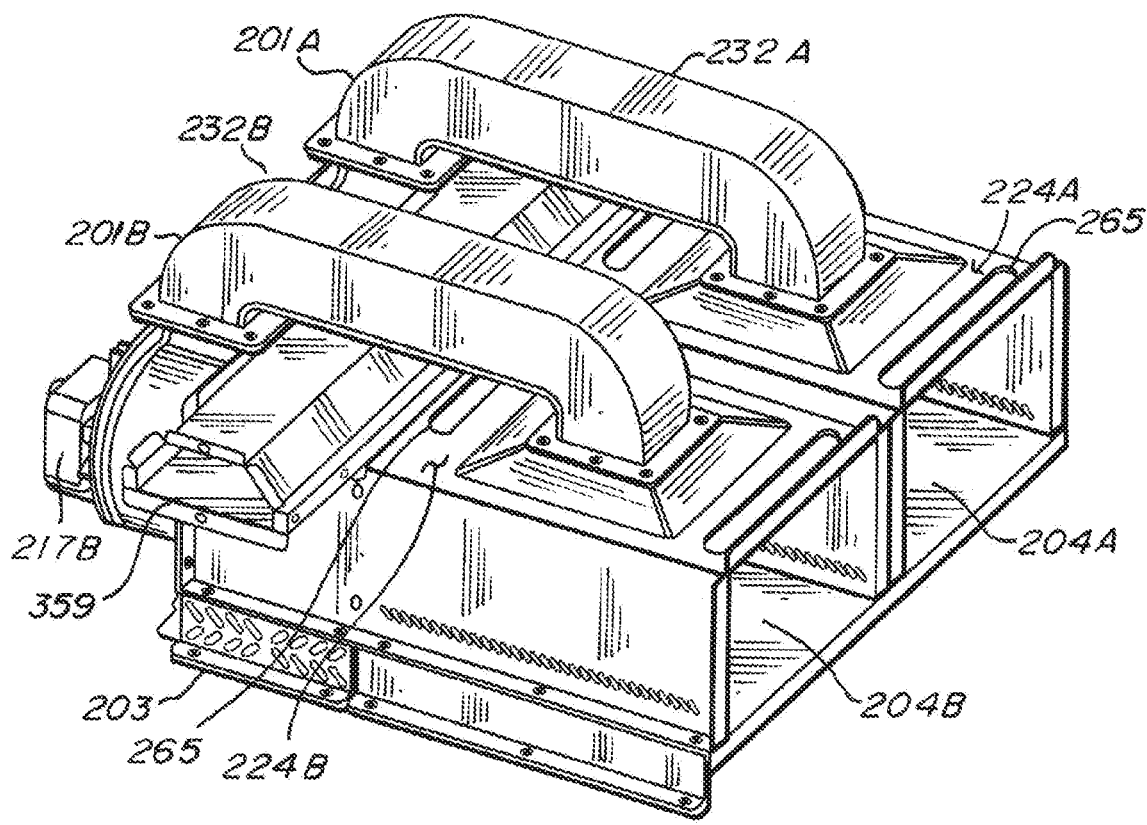
FIG. 15 is a left-side perspective view of the accessory of FIG. 13 with its drawers removed.

The burner 110 is shown independently in FIG. 11 and is a typical tubular gas burner similar to those commonly used in gas barbeques, having an elongated stainless-steel tube 130 with a line of orifices 138 along each side. Gas flows from the orifices and is ignited by ignitor 140, which is a typical magneto spark-producing device common built into gas barbeques and actuated by a trigger button (not shown). The gas burns during frying to provide heat for frying.

Figure 12:
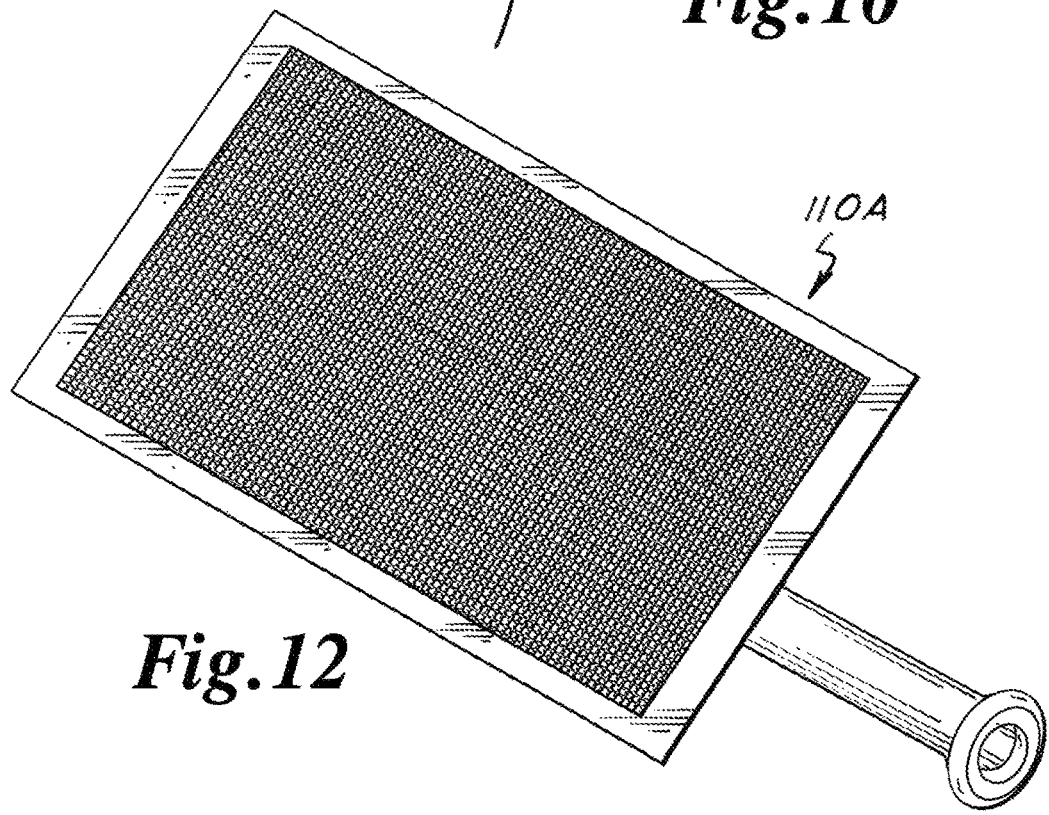
FIG. 12 is a view of an alternate gas infrared burner for the accessory of FIG. 1.

An alternative infrared gas burner 110A is shown in FIG. 12, which is similar to those commonly used in searing barbeques.

It is a unique feature of the burner and blower portion that the temperature of the flame is increased by the blower, by pulling ambient air AA in through ambient air intakes 106 at the bottom of the burner and blower portion and drawing some AA2 of that air through a line of ports 144 along the diagonal walls 116 along the bottom of the burner's stainless steel combustion enclosure 146. This is all best seen in FIGS. 7 through 9.

The ports are arranged parallel to and are directed at the line of orifices 138 of the burner and sized to force the incoming air into a series of linear air jets which impinge as upon the base of the flames exiting the orifices. This injects oxygen directly into the base of each flame and increases its temperature to over 1000 C and increases the flame's intensity significantly. The air directed at the flame is strong enough to increase gas combustion but not strong enough to blow out the flame. The "super-heated" air AH that is thereby created is mixed with that portion AA3 of the ambient air that bypassed the combustion enclosure 146 to create cooking air AC of approximately 230 C, which is then pulled by the blower and forced through window 112, through the perforated bottom panel 118 and into the basket, by which time the long and serpentine air path has cooled it to approximately 220 C for cooking the food therein.

The injection of ambient air into the flame also causes the propane to burn more evenly and efficiently and reduces the production of undesirable CO and NOx gases.

Stainless steel wave panel 148 of the drawer serves the purpose of turbulizing and directing the cooking air as it enters the basket, which is important for evenly cooking and browning the food. The wave panel has two ramps 150 and 152 which are perpendicular to the airflow. Ramp 150 is impacted first by the heated air and causes some of the heated air to pass immediately through the perforated bottom panel and into the basket while allowing the remainder of the heated air to pass there-over and under the perforated bottom panel towards ramp 152, which then deflects that remining air towards and through the perforated bottom panel. This results in a very even distribution of the heated air through the perforated bottom panel while allowing it to remain in a very turbulent state, so that the food is exposed to the cooking air evenly on all sides and from all directions.

The cooking air is then exhausted through outlet 132, which directs it back away from the user-accessible front 154 of the accessory and into the interior of the barbeque grill . . . where it may be used to compliment the barbequing heat.

A second exemplary air frying accessory 201 having a plurality of modules 201A, 201B, and possible additional identical modules (not shown), for use with an outdoor cooking appliance is shown in FIGS. 13 through 21. Features equivalent to those of the first embodiment are not described in meticulous detail to avoid redundancy but should be assumed the same as or equivalent to those in the previous embodiment where not stated otherwise. The air frying accessory and the outdoor cooking appliance may both again receive propane gas for burning from the same tank or may employ some other type of combustible gas or other fuel.

The air frying modules share a single heat exchanging system 203. Each module has a chamber portion 204A, 204B, etc. (individually as 204). The heat exchanging system has intakes 206 for receiving ambient air, an H-shaped burner 210 for combusting the propane gas to combine with and heat the received ambient air to create a heated mixture or air and products of combustion, a heat exchanging manifold, 246A, 246B, etc. (individually as 246) in thermal communication with the burner and the chamber portions, a blower 217A, 217B, etc. (individually as 217) for each module for passing a second stream of frying air through the heat exchanging manifold to draw heat there-from to heat the second stream into heated frying air 216 and to continuously provide the heated frying air into the associated module's chamber portion, and an array of exhaust openings 207A, 207B, etc. (individually as 207) for pulling the combusted gas mixture after its heat has been absorbed by the heat exchanging manifold. Each blower may be operated independently as with the first embodiment, thereby allowing only one or a selected number of the chamber portions to be heated at a time, as needed.

The heat exchanging system allows foodstuff to be cooked in heated frying air that does not include any products of combustion, because none of the burned propane is disbursed into the cooking chambers. This improves the taste, appearance, and healthfulness of the cooked foodstuff. And the heat exchanging system allows for greatly increased air frying temperatures by recycling the heated frying air continuously there-through, where it picks up more and more heat on each pass.

Figure 26:
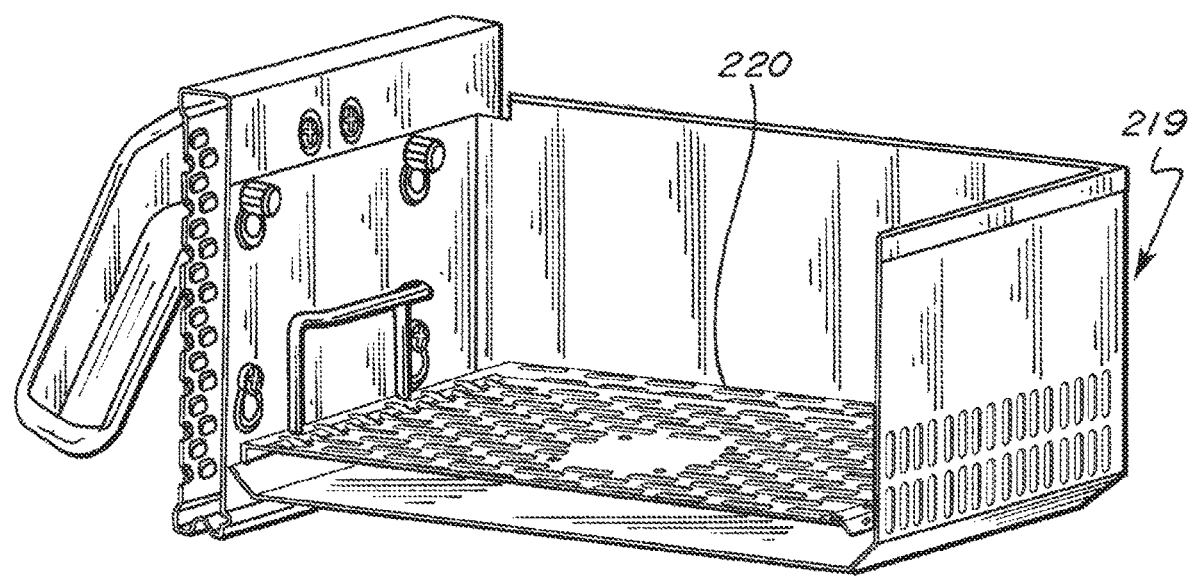
FIG. 26 is a cut-away view of a draw of the accessory of FIG. 13.
Figure 27:
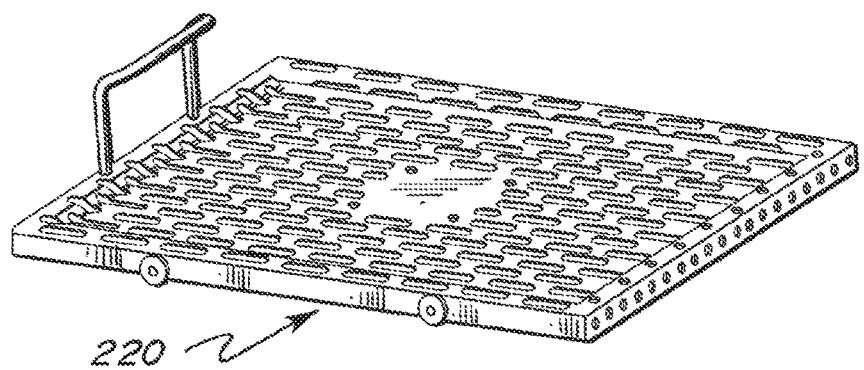
FIG. 27 is a perspective view of the removed tray of the accessory of FIG. 13.

The blowers each include an electric motor and a cylindrical blower wheel for moving the heated second airstream, a blower intake through which heated air is pulled from the heat exchanging manifold, and a blower exhaust through which the heated air is sent to the cooking chamber portion. Each chamber portion includes a perforated tray 220, similar to the basket of the first embodiment, for receiving the foodstuff and to allow exposure of the foodstuff to the heated frying air 216. The tray is removable from drawer 219 as seen in FIGS. 26 and 27 for serving and washing. A portion of the air moved by the blower feeds the flame to insure complete combustion of the fuel for maximum flame temperature and increased air temperature.

Figure 20:
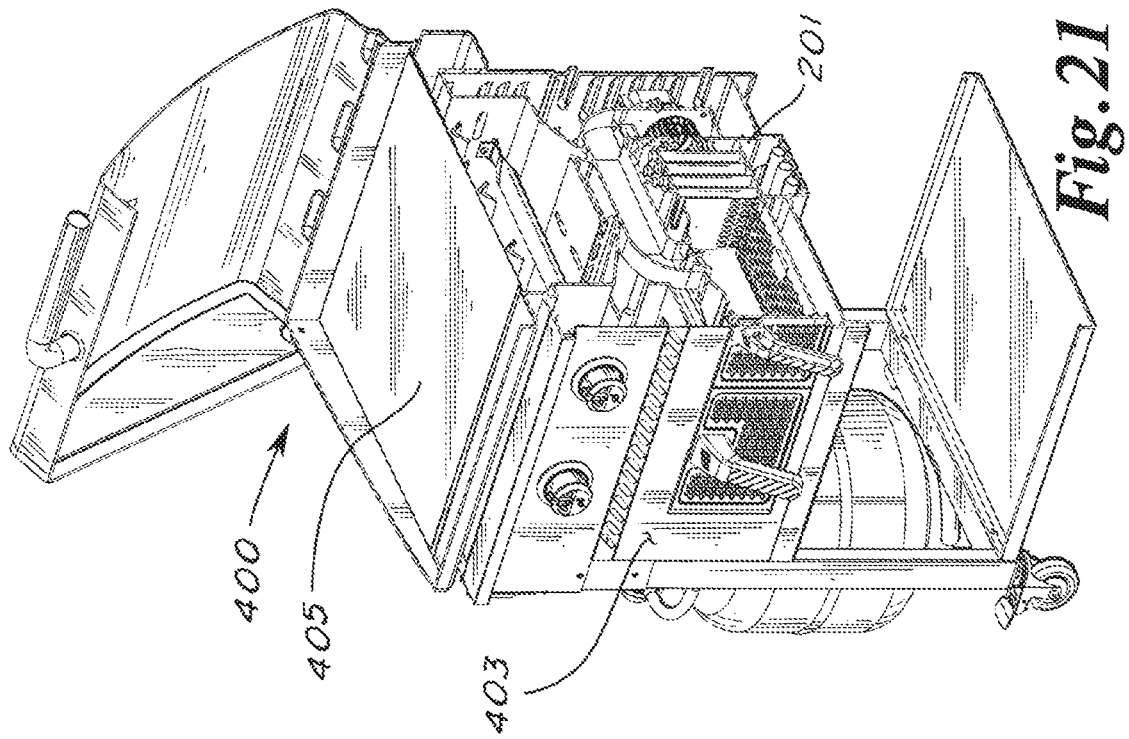
FIG. 20 is a partial cut-away frontal view of the accessory of FIG. 13 in combination with a barbeque grill.

Each chamber portion is covered by a chamber cover 224A, 224B, etc. (individually as 224) so that the tray is enclosed within an associated cooking chamber 220 during frying. Each chamber cover communicates with a recycling duct 232A, 232B, etc. (individually as 232) which allows the heated frying air to continuously enter the chamber, cook the food therein, and return to the associated blower's intake after passing through the heat exchanging manifold to continuously increase its temperature. By repeatedly passing the heated air through the heat exchanging system, its temperature is much increased over that possible purely from burning propane with relatively cool incoming ambient air. Ultimately, the temperature in the cooking chamber can reach as high as 450 F. When mounted within a barbeque 300 as shown in FIG. 20 or within an outdoor griddle 400 as in FIG. 21 and the barbeque or griddle is in operation, the temperature in the cooking chamber can reach 475 F.

The air that is drawn into the blowers to form the frying air is a combination of recirculated previously heated air and fresh air drawn in through intake slots 209. The frying may cause smoke and humidity during cooking and vents 265 allow some of the smoky humid frying air to be exhausted at the same rate that fresh air is drawn in through the slots so that the smoky humid frying air is continuously replaced by the fresh air entering the slots. By limiting the size of the slots and vents, this amount of exchanged air is minimal so that the temperature of the frying air is not significantly reduced.

The blower pushes the heated frying air into the tops of the cooking chambers through the recycling ducts 232 and cover openings 269, where louvers 260 deflect it and cause it to be disbursed evenly throughout the cooking chamber. The blower simultaneously pulls the heated frying air from the chamber through an array of perforations 207 at the back bottom of each chamber, whereby the air is pulled again through the heat exchanging manifold.

An optional thermostat 275 communicating thermally with the heated frying air may be disposed anywhere within the heated frying air's flow path to monitor its temperature and may control the burner and/or the blower to regulate heating by the burner and/or airflow by the blower when a preselected cooking chamber temperature is reached, thereby maintaining the cooking chamber temperature at the preselected temperature. The thermostat is adjustable to allow the temperature in the cooking chamber to be vary from 300 F to 475 F.

Figure 21:
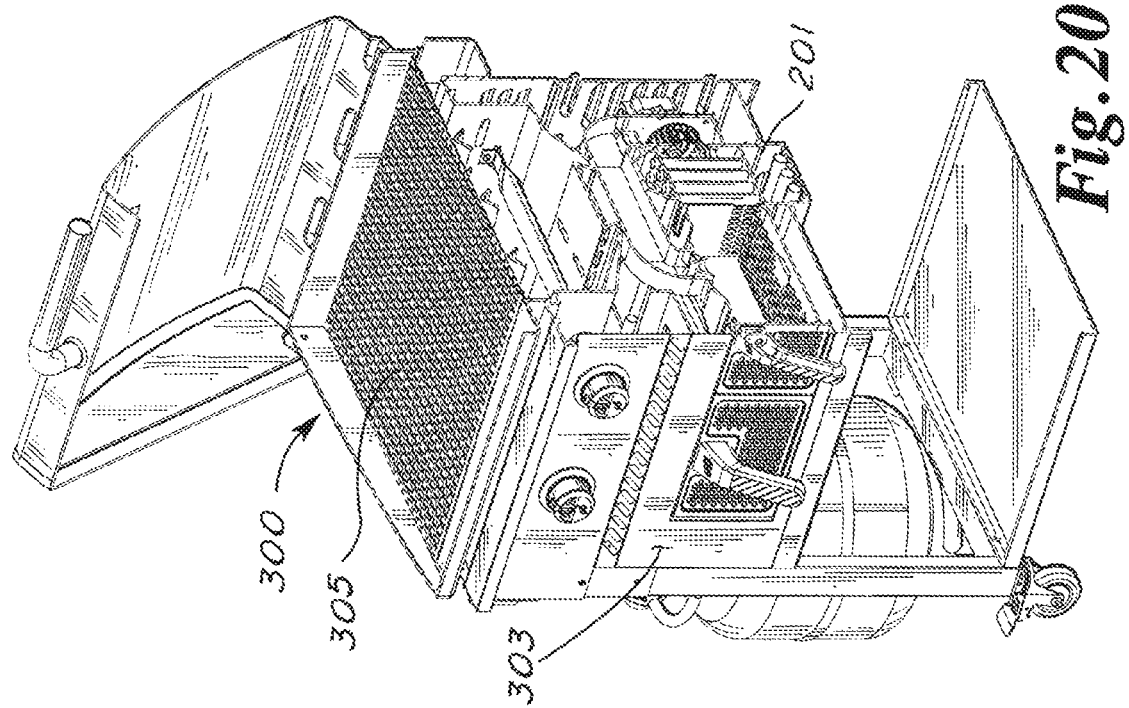
FIG. 21 is a partial cut-away frontal view of the accessory of FIG. 13 in combination with an outdoor griddle.
Figure 22:
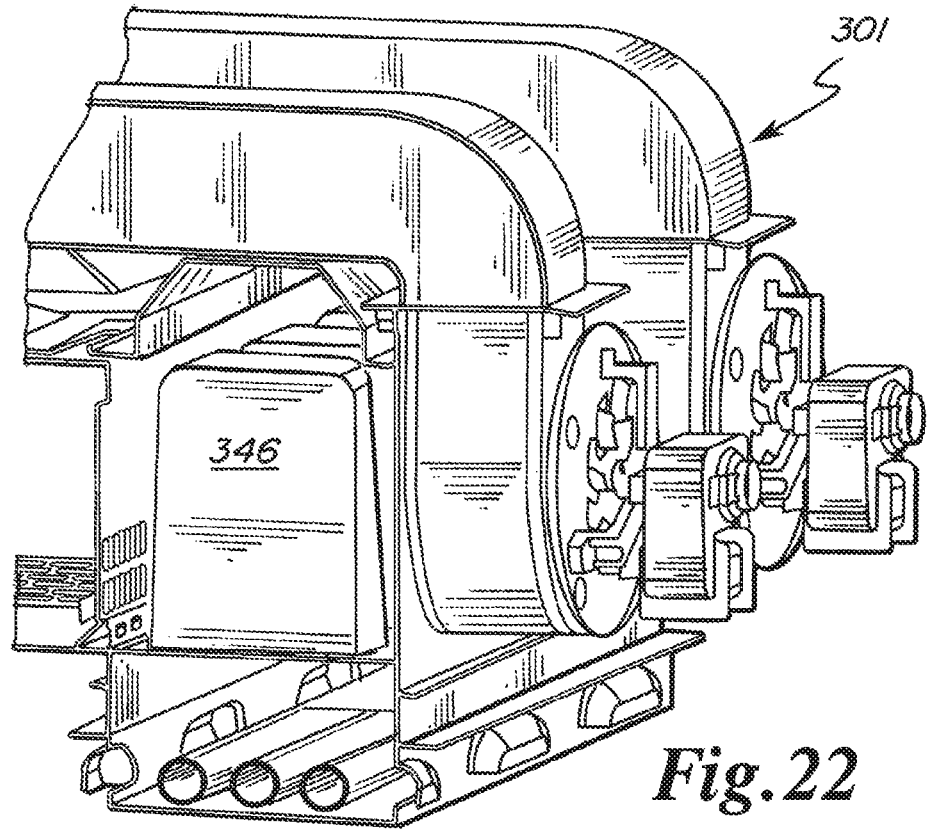
FIG. 22 is a partial rear perspective view of a third accessory in accordance with or useful in practicing the invention.
Figure 25:
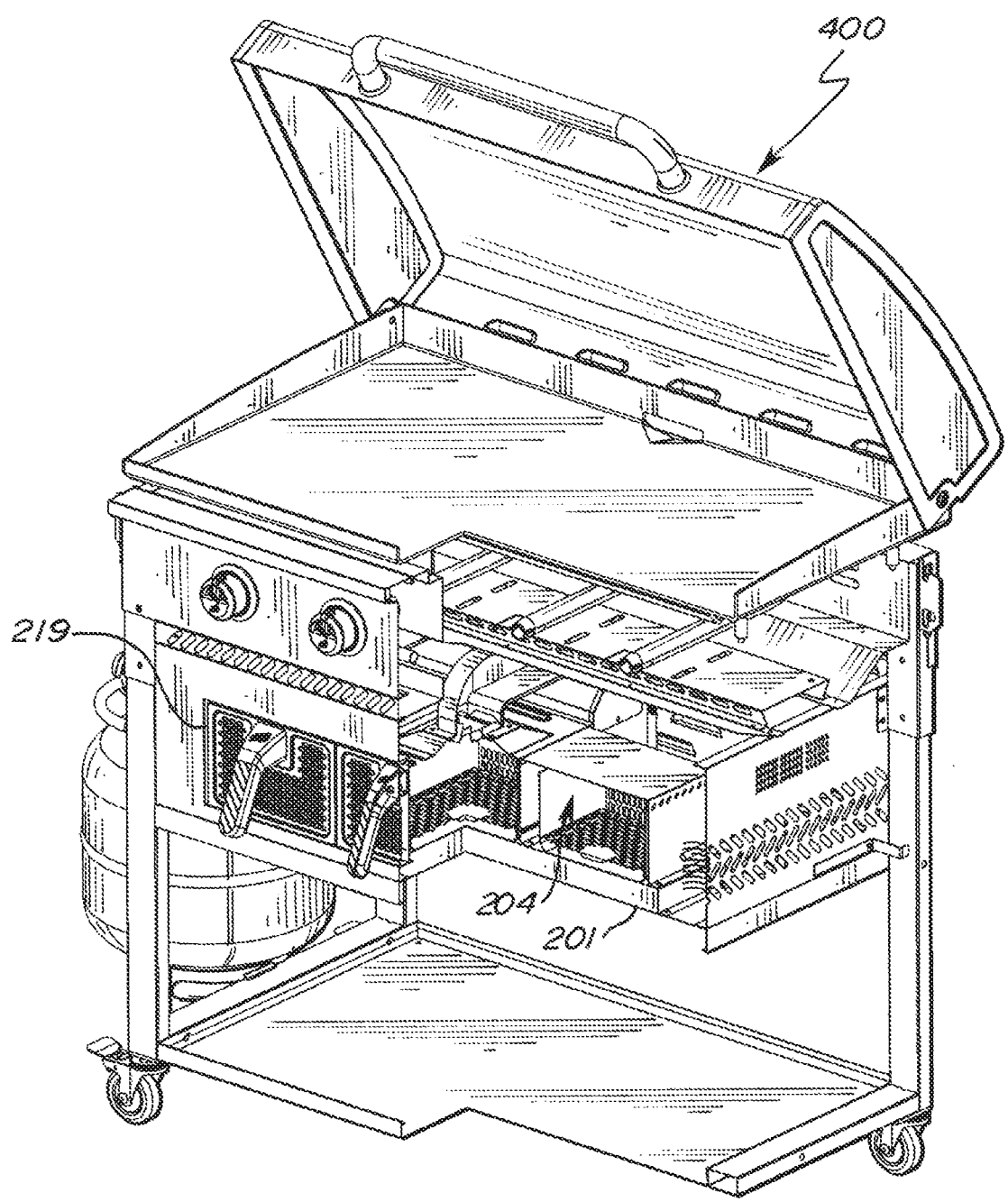
FIG. 25 is a partial view of the accessory of FIG. 13 in combination with an outdoor griddle of FIG. 21.

The accessory may be embodied independently as a stand-alone appliance, or housed by an outdoor cooking appliance similar to the first embodiment, as shown in FIGS. 20, 21 and 25. FIG. 20 shows the accessory combined into a barbeque grill 300 with body 303 and cooking surface (grill) 305. FIGS. 22 and 25 show the accessory combined into an outdoor griddle appliance 400 with body 403 and cooking surface (griddle 405). The bottoms of the chamber portions are similarly drawers adapted to be pulled from the cooking appliance's body 303 or 403 to access their trays. When one of the drawers is so pulled from the barbeque, cover 224 remains stationary within the barbeque. The open top of the drawer is thereby covered by the gas outdoor cooking appliance during the air-frying and is uncovered when pulled from the appliance to allow access to the drawer's tray.

The heat exchanging manifold 246 of this embodiment is made up of an array of hollow tubes 252 with open bottoms 276 through which the combusted gas can enter and open tops 277 through the combusted gas can escape. The tubes are equally spaced apart to provide a consistent temperature across the heat exchanging manifold and avoid hot and cold spots. The tubes are preferably made of thin-walled metal chosen for heat transfer efficiency and durability, and instantly absorb the heat from the combusted gas rising there-through. Preferably Burner 210 is an "H" version of the one shown independently in FIG. 11 and previously described. Gas flows from their orifices and is ignited by an ignitor as in the first embodiment. The gas burns during operation, is fed by and mixed with the incoming ambient air and rises into the chimneys to heat the manifold. The thinness of the tubes enables the heat absorbed from the combusted gas to be instantly realized at the exteriors of the tubes, which are exposed to the flow of the frying air stream. The heat within the pockets is thereby transferred into the frying airstream while the products of combustion in the gas mixture within the pockets are not.

The combusted gas mixture is continuously exhausted through outlet 359 at the left end of the heat exchanger so that it is directed away from the intakes of the cooking chambers.

The outdoor cooking appliance also has a warming chamber (not shown) for maintaining cooked food at a servable temperature. The warming chamber is disposed within a drawer that is fashioned similarly to the cooking chamber drawers 219 and the drawer is positioned in line with the cooking chamber drawers. The warming chamber is preferably warmed by a combination of conduction and convection from the adjacent cooking chambers and the outdoor cooking appliance but may alternatively be warmed by a lower-temperature version of the heating system of the cooking chambers.

Figure 23:
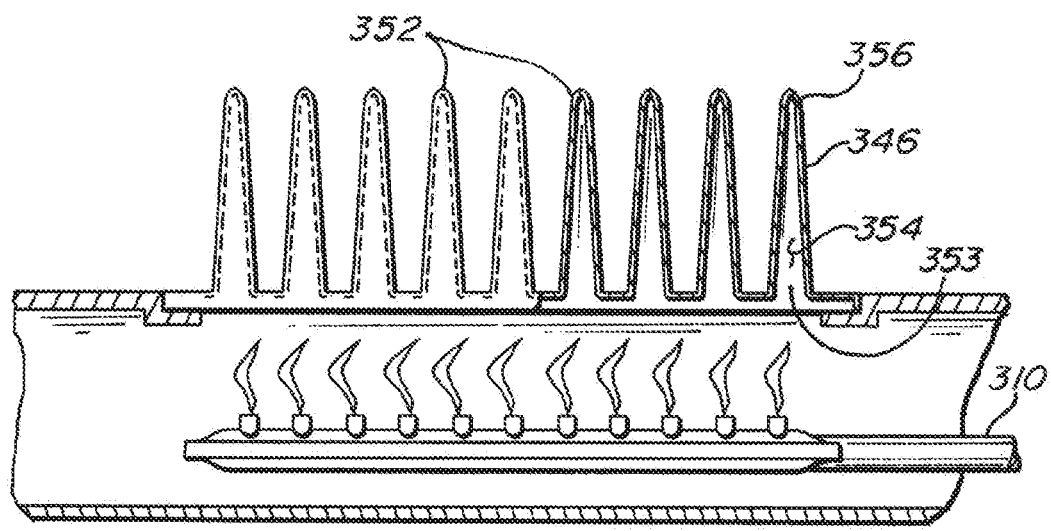
FIG. 23 is a cut-away view of the heat exchanging system of the accessory of FIG. 22.
Figure 16:
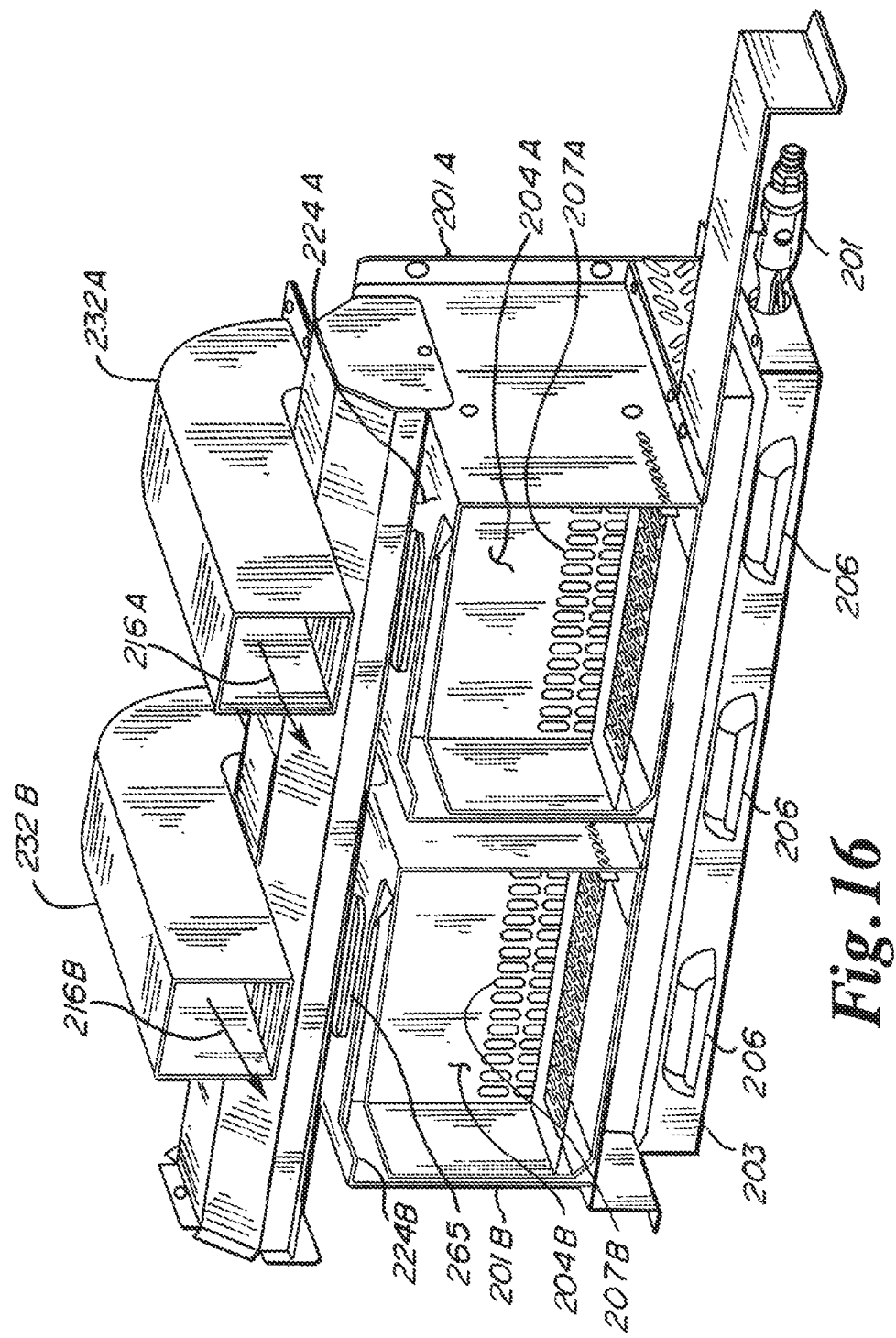
FIG. 16 is a partial cut-away front perspective view of the accessory of FIG. 13.
Figure 17:
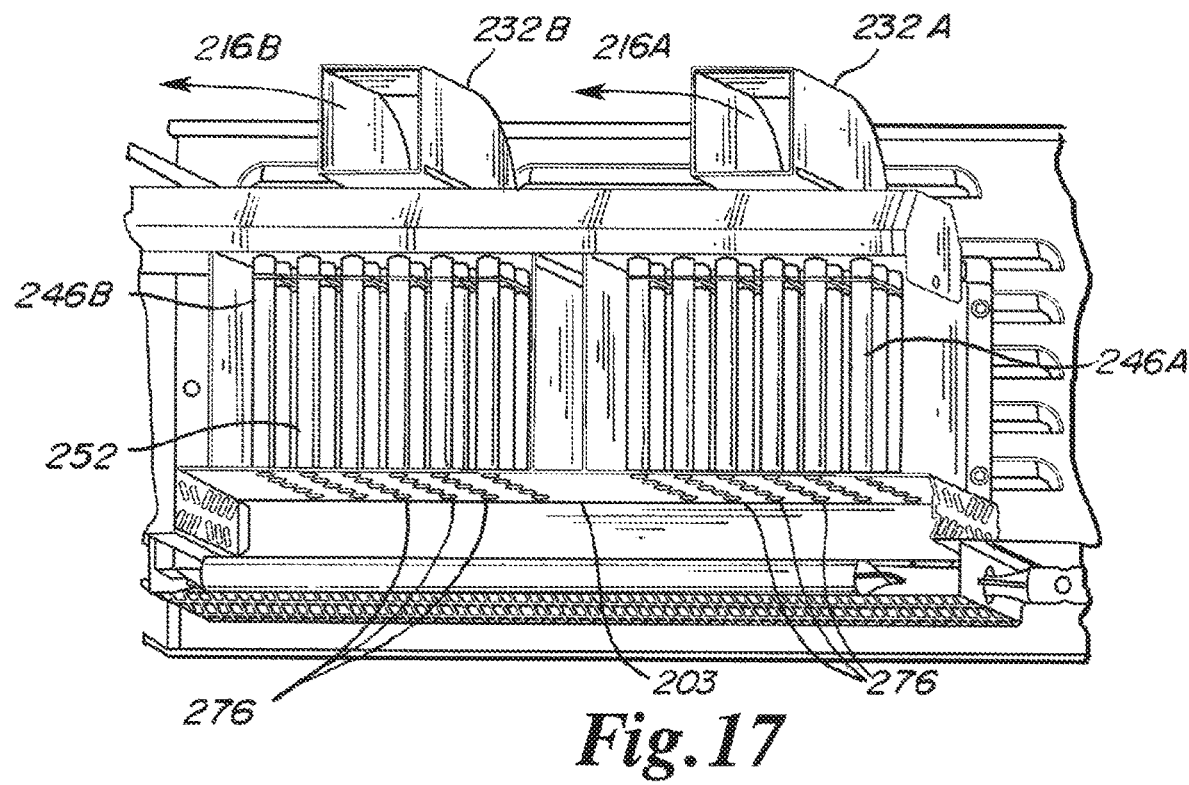
FIG. 17 is a partial cut-away frontal under view of the accessory of FIG. 13.
Figure 18:
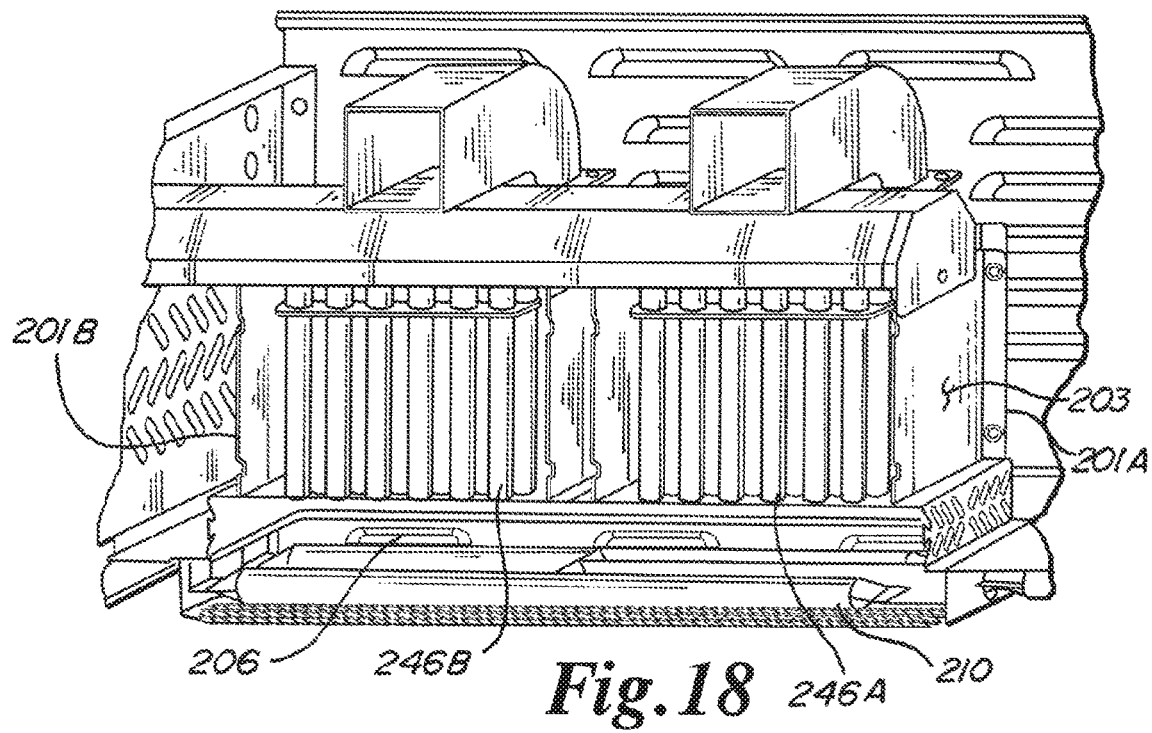
FIG. 18 is a partial cut-away frontal over-view of the accessory of FIG. 13.
Figure 19:
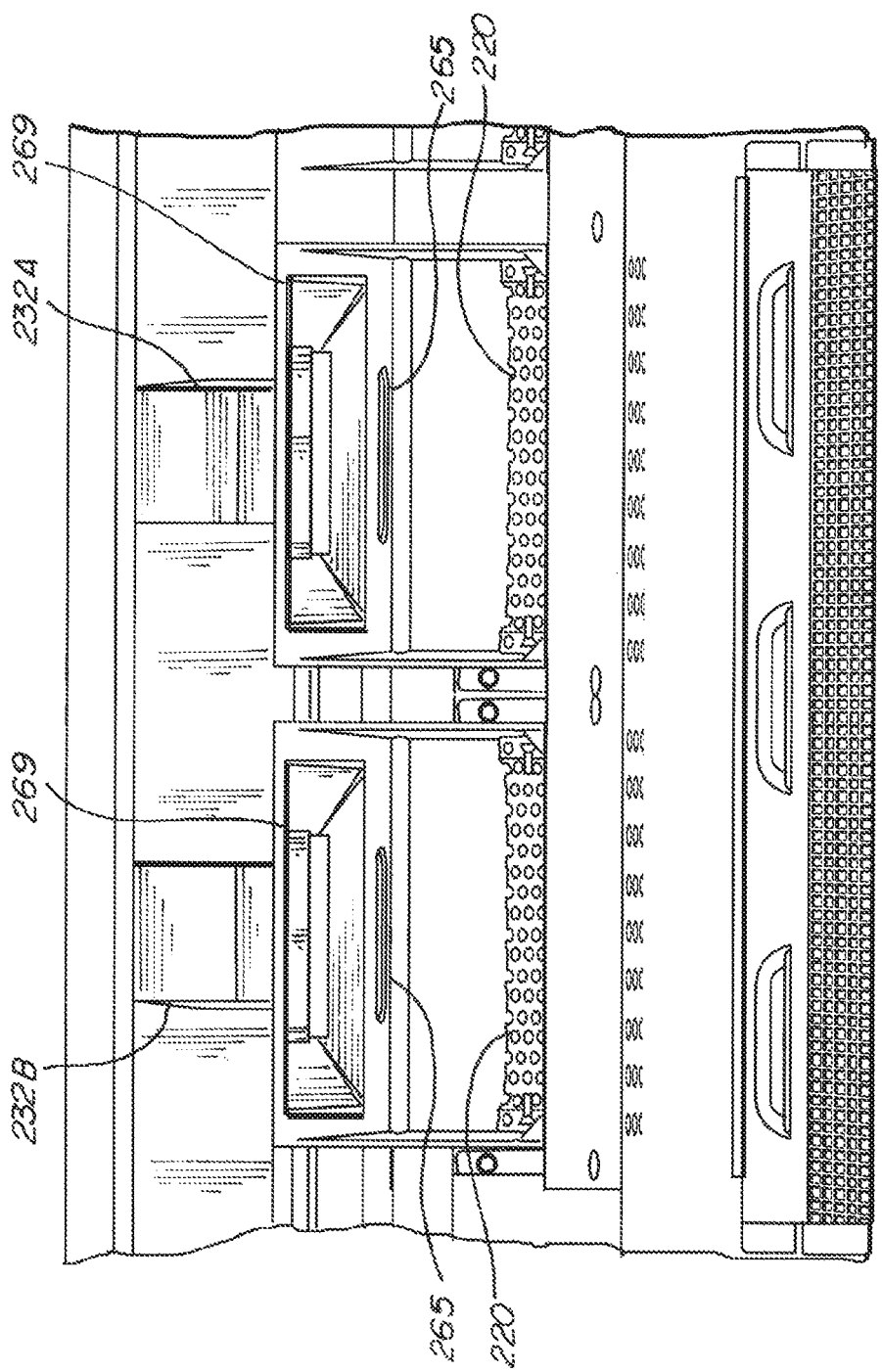
FIG. 19 is a partial cut-away view of the accessory of FIG. 13 taken at line 19-19 of FIG. 14.

A third exemplary air frying accessory 301 similar to the second embodiment except having a different heat exchanging system is shown in FIGS. 21 through 23. Features equivalent to those of the earlier embodiments are not described to avoid redundancy. The air frying modules again share the single heat exchanging system.

Figure 24:
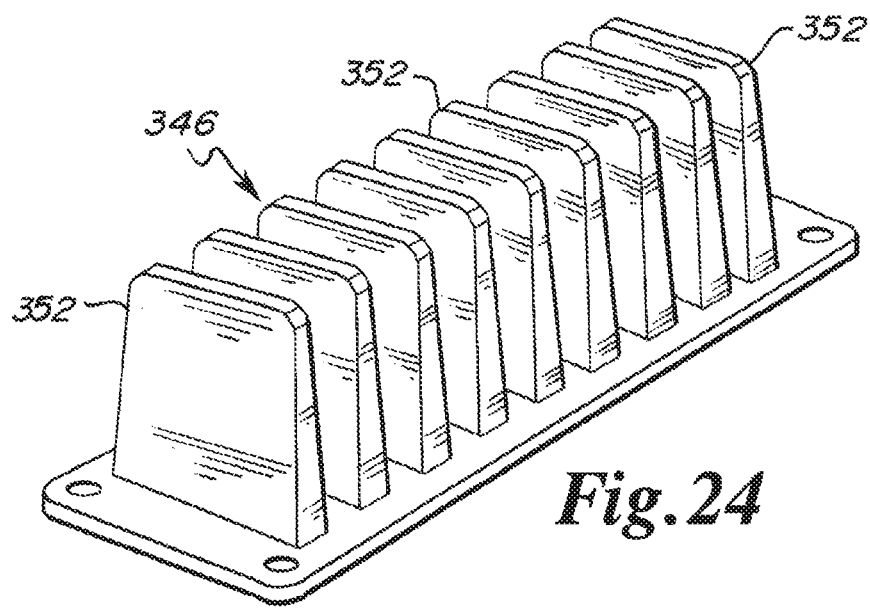
FIG. 24 is a perspective view of the heat exchanging manifold of the accessory of FIG. 22.

The heat exchanging manifold 346 of this embodiment is best understood by reference to FIGS. 23 and 24. It is made up of a series of hollow fins 352, each having an open bottom 353 so that a hollow pocket 354 is formed within the fin that is accessible from its underside, and having a heat-radiating domed topside 356. The exchanger is preferably made of thin-walled diecast aluminum, chosen again for its heat transfer efficiency.

Burner 310 is similar to that shown independently in FIG. 11 and previously described. Gas flows from its orifices and is ignited by an ignitor as in the previous embodiments. The gas burns during operation, is fed by and mixed with the incoming ambient air and rises into the hollow pockets to heat the fins. The thinness of the fins enables the heat absorbed from the pockets to be instantly realized at the domed topsides, which are exposed to the flow of the frying air stream. The heat within the pockets is thereby transferred into the frying airstream while the products of combustion in the gas mixture within the pockets are not.

The combusted gas mixture is continuously exhausted through an outlet similar to the previous embodiment.

While the air frying modules of all three embodiments are shown as built-in accessories to a barbeque grill, one or more modules could alternatively be enclosed within a dedicated housing to provide an independent stand-alone gas-powered air frying appliance. In all cases, the bottoms of the chamber portions are drawers 219 adapted to be pulled from the outdoor cooker's or the apparatus' housing to access the tray. When a drawer is so pulled from the barbeque, its cover remains stationary within the housing. The open top of the drawer is thereby covered by the housing during air-frying and is uncovered when pulled from the housing to allow access to the drawer's tray.

While the invention has been shown and described with reference to a specific exemplary embodiment, it should be understood by those skilled in the art that various changes in form and detail may be made without departing from the spirit and scope of the invention, and that the invention should therefore only be limited according to the following claims, including all equivalent interpretation to which they are entitled.

The invention claimed is:

1. An air frying apparatus comprising a burner, a blower, a heat exchanger, and a cooking chamber;
   the burner adapted to combust fuel to create heat and other products of combustion;
   the blower adapted to circulate a cooking airstream;
   the heat exchanger adapted to allow passage of the heat from the combusted fuel while preventing passage of the other products of combustion into the cooking air stream;
   the blower further adapted to supply the heated cooking airstream through the heat exchanger to the cooking chamber to cook foodstuff disposed therein, whereby the other products of combustion are not supplied to the cooking chamber;
   wherein the apparatus further comprises a housing and a drawer;
   wherein the housing comprises the burner, blower and heat exchanger and has a frontal opening for receiving the drawer;
   wherein the drawer comprises the cooking chamber and a cover; and
   wherein the drawer is adapted to close the frontal opening during air frying and to be pulled completely from the housing while its cover remains stationary within the housing, so that the cooking chamber is covered during air-frying within the housing and is uncovered when the drawer is pulled from the housing to allow access to the cooking chamber.

2. The apparatus of claim 1 wherein the burner is a gas burner.

3. The apparatus of claim 2 wherein the blower is an electric blower.

4. The apparatus of claim 3 wherein the drawer comprises a perforated tray for containing the foodstuff, disposable within the housing during cooking and removable from the housing to access the foodstuff.

5. The apparatus of claim 4 wherein the tray is covered by the cover during cooking and is uncovered when removed from the housing to allow the access to the tray.

6. The apparatus of claim 5 further comprising an outdoor cooking appliance having a body comprising the housing.

7. The apparatus of claim 6 wherein the outdoor cooking appliance comprises a cooking surface from the group including a grill and a griddle; and wherein the burner, blower, heat exchanger, and cooking chamber are disposed below the cooking surface.

8. The apparatus of claim 7 further comprising a thermostat adapted for sensing temperature of the heated cooking airstream and in communication with one or both of the blower and the burner and adapted to control the one or both in response to the sensed temperature.

9. The apparatus of claim 8 further comprising a selected temperature level and wherein the thermostat modifies operation of the one or both when the sensed temperature reaches the selected temperature.

10. The apparatus of claim 9 further comprising one or more additional cooking chambers and one or more additional blowers adapted to selectively supply one or more additional heated cooking airstreams through the heat exchanger to the one or more additional cooking chambers to selectively cook foodstuff disposed therein.

11. In combination, an outdoor cooking appliance and an air frying apparatus, the air frying apparatus comprising:
    a frying burner, a blower, a heat exchanger, and a cooking chamber;
    the frying burner adapted to combust fuel to create heat and other products of combustion;
    the blower adapted to circulate a cooking airstream;
    the heat exchanger adapted to allow passage of the heat from the combusted fuel while preventing passage of the other products of combustion into the cooking air stream;
    the blower further adapted to supply the heated cooking airstream through the heat exchanger to the cooking chamber to cook foodstuff disposed therein; whereby the other products of combustion are not supplied to the cooking chamber;
    wherein the apparatus further comprises a housing and a drawer;
    wherein the housing comprises the burner, blower and heat exchanger and
    has a frontal opening for receiving the drawer;
    wherein the drawer comprises the cooking chamber and a cover; and
    wherein the drawer is adapted to close the frontal opening during air frying and to be pulled completely from the housing while its cover remains stationary within the housing, so that the cooking chamber is covered during air-frying within the housing and is uncovered when the drawer is pulled from the housing to allow access to the cooking chamber.

12. The combination of claim 11 wherein the frying burner is a gas burner.

13. The combination of claim 12 wherein the blower is an electric blower.

14. The combination of claim 13 further wherein the outdoor cooking appliance has a body comprising the housing and wherein the drawer comprises a perforated tray for containing the foodstuff, disposable within the housing during cooking and removable from the housing to access the foodstuff.

15. The combination of claim 14 wherein the tray is covered by the cover during cooking and is uncovered when removed from the housing to allow the access to the tray.

16. The combination of claim 15 further comprising a fuel supply tank and a grilling burner and wherein the fuel supply tank provides fuel to both the frying burner and the grilling burner.

17. The combination of claim 16 wherein the outdoor cooking appliance comprises a cooking surface from the group including a grill or griddle; and wherein the frying burner, blower, heat exchanger, cooking chamber, and grilling burner are disposed below the cooking surface.

18. The combination of claim 17 further comprising a thermostat adapted for sensing temperature of the heated cooking airstream and in communication with one or both of the blower and the frying burner and adapted to control the one or both in response to the sensed temperature.

19. The combination of claim 18 further comprising a selected temperature level and wherein the thermostat modifies operation of the one or both when the sensed temperature reaches the selected temperature.

20. The combination of claim 19 further comprising one or more additional cooking chambers and one or more additional blowers adapted to selectively supply one or more additional heated cooking airstreams through the heat exchanger to the one or more additional cooking chambers to selectively cook foodstuff disposed therein.

* * * * *